United States Patent
Tanimoto

(10) Patent No.: US 8,949,419 B2
(45) Date of Patent: Feb. 3, 2015

(54) SYNCHRONIZING SHARING SERVERS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 134 days.

(21) Appl. No.: 12/270,883

(22) Filed: Nov. 14, 2008

(65) Prior Publication Data

US 2009/0164636 A1   Jun. 25, 2009

(30) Foreign Application Priority Data

Dec. 25, 2007  (JP) ................. 2007-333156

(51) Int. Cl.
| | | |
|---|---|---|
| G06F 15/173 | (2006.01) | |
| H04L 29/08 | (2006.01) | |
| H04L 12/24 | (2006.01) | |
| H04L 12/66 | (2006.01) | |
| G06F 17/30 | (2006.01) | |

(52) U.S. Cl.
CPC .............. *H04L 67/104* (2013.01); *H04L 12/66* (2013.01); *H04L 41/0893* (2013.01); *H04L 67/1063* (2013.01); *G06F 17/30194* (2013.01); *H04L 67/1095* (2013.01); *H04L 67/1065* (2013.01); *H04L 67/28* (2013.01); *H04L 67/1059* (2013.01)
USPC .......................................... 709/225; 709/226

(58) Field of Classification Search
CPC . H04L 67/28; H04L 67/1095; H04L 67/1059; H04L 67/1063; H04L 12/66; H04L 41/0893; G06F 17/30194
USPC ......................................... 709/205, 225, 226
See application file for complete search history.

(56) References Cited

U.S. PATENT DOCUMENTS

| | | | |
|---|---|---|---|
| 6,574,656 B1 | 6/2003 | Nagaoka et al. | |
| 6,898,641 B1 | 5/2005 | Kobayashi | |
| 6,938,042 B2 * | 8/2005 | Aboulhosn et al. ................... | 1/1 |

(Continued)

FOREIGN PATENT DOCUMENTS

| | | |
|---|---|---|
| EP | 1 940 126 | 7/2008 |
| EP | 1 942 634 A1 | 7/2008 |

(Continued)

OTHER PUBLICATIONS

Tanimoto: "Relay Server and Relay Communication System," U.S. Appl. No. 12/335,642, filed Dec. 16, 2008.

(Continued)

*Primary Examiner* — Oleg Survillo
(74) *Attorney, Agent, or Firm* — Keating & Bennett, LLP

(57) ABSTRACT

A relay server and a relay communication system can easily synchronize resource information with a resource when terminals share the resource. When an instruction to synchronize shared resource information is given, the relay server transmits the synchronization instruction to each resource sharing terminal based on the shared resource information. Having received the synchronization instruction, when the shared resource information includes the resource that is owned by the terminal, the resource sharing terminal compares the resource information and the resource. If the resource information and the resource do not match, the resource sharing terminal updates the resource information to the latest information, and transmits, to the relay server, an instruction to update the shared resource information including the resource information. Thus, the resource information of an entire network can be synchronized by one synchronization instruction.

21 Claims, 16 Drawing Sheets

(56) References Cited

U.S. PATENT DOCUMENTS

| | | | |
|---|---|---|---|
| 7,058,696 B1 * | 6/2006 | Phillips et al. | 709/217 |
| 7,647,388 B2 | 1/2010 | Kato | |
| 8,065,418 B1 | 11/2011 | Abuan et al. | |
| 2002/0016839 A1 * | 2/2002 | Smith et al. | 709/224 |
| 2002/0059436 A1 | 5/2002 | Kubo | |
| 2002/0118398 A1 * | 8/2002 | Tanimoto | 358/407 |
| 2002/0143855 A1 | 10/2002 | Traversat et al. | |
| 2002/0143956 A1 | 10/2002 | Tanimoto | |
| 2002/0146002 A1 | 10/2002 | Sato | |
| 2003/0140637 A1 | 7/2003 | Masui et al. | |
| 2003/0144872 A1 | 7/2003 | Masui et al. | |
| 2004/0078426 A1 | 4/2004 | Nagami et al. | |
| 2004/0148432 A1 | 7/2004 | Udono et al. | |
| 2004/0172395 A1 | 9/2004 | Edelstein et al. | |
| 2004/0218611 A1 | 11/2004 | Kim | |
| 2005/0015436 A1 * | 1/2005 | Singh et al. | 709/203 |
| 2005/0076098 A1 | 4/2005 | Matsubara et al. | |
| 2005/0216523 A1 | 9/2005 | Sakaguchi et al. | |
| 2006/0083171 A1 | 4/2006 | Tanaike et al. | |
| 2006/0101064 A1 * | 5/2006 | Strong et al. | 707/102 |
| 2006/0256771 A1 | 11/2006 | Yarlagadda | |
| 2006/0282540 A1 | 12/2006 | Tanimoto | |
| 2007/0233844 A1 | 10/2007 | Tanimoto | |
| 2007/0274329 A1 | 11/2007 | Takeyoshi et al. | |
| 2008/0005188 A1 * | 1/2008 | Li et al. | 707/201 |
| 2008/0005195 A1 * | 1/2008 | Li | 707/203 |
| 2008/0089349 A1 | 4/2008 | Tanimoto | |
| 2008/0137672 A1 | 6/2008 | Tanimoto | |
| 2008/0147825 A1 | 6/2008 | Tanimoto | |
| 2008/0288591 A1 | 11/2008 | Tanimoto | |
| 2008/0298367 A1 | 12/2008 | Furukawa | |
| 2010/0241711 A1 * | 9/2010 | Ansari et al. | 709/205 |

FOREIGN PATENT DOCUMENTS

| | | |
|---|---|---|
| JP | 04-105143 A | 4/1992 |
| JP | 09-168055 A | 6/1997 |
| JP | 09-282216 A | 10/1997 |
| JP | 2000-059465 A | 2/2000 |
| JP | 2001-092702 A | 4/2001 |
| JP | 2001-292167 A | 10/2001 |
| JP | 2001-306382 A | 11/2001 |
| JP | 2002-007182 A | 1/2002 |
| JP | 2002-149519 A | 5/2002 |
| JP | 2002-199150 A | 7/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-032310 A | 1/2003 |
| JP | 2004-139291 A | 5/2004 |
| JP | 2004-201255 A | 7/2004 |
| JP | 2004-213533 A | 7/2004 |
| JP | 2004-229299 A | 8/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-115943 A | 4/2005 |
| JP | 2005-157699 A | 6/2005 |
| JP | 2005-267658 A | 9/2005 |
| JP | 2005-276094 A | 10/2005 |
| JP | 2005-328239 A | 11/2005 |
| JP | 2006-033105 A | 2/2006 |
| JP | 2006-202218 A | 8/2006 |
| JP | 2006-268138 A | 10/2006 |
| JP | 2006-337021 A | 12/2006 |
| JP | 2006-343943 A | 12/2006 |
| JP | 2007-104440 A | 4/2007 |
| JP | 2007-265135 A | 10/2007 |
| JP | 2007-267136 A | 10/2007 |
| JP | 2007-310508 A | 11/2007 |
| JP | 2008-028600 A | 2/2008 |
| JP | 2008-092520 A | 4/2008 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-031828 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2010-256989 A | 11/2010 |
| JP | 2010-267084 A | 11/2010 |
| JP | 2010-278636 A | 12/2010 |
| JP | 2011-055452 A | 3/2011 |
| JP | 2011-055453 A | 3/2011 |
| JP | 2011-055454 A | 3/2011 |
| JP | 2011-160103 A | 8/2011 |
| WO | 2006/090465 A1 | 8/2006 |

OTHER PUBLICATIONS

Tanimoto: "Relay Server and Relay Communication System," U.S. Appl. No. 12/335,661, filed Dec. 16, 2008.

Tanimoto: "Relay Server and Relay Communication System," U.S. Appl. No. 12/340,868, filed Dec. 22, 2008.

Shinji Okumura et al., SIP (session initiation protocol), Nikkei Communications, Sep. 22, 2003, pp. 150-158 (partial translation pp. 155-156 (Usable in IM and Presence Notification)).

Official communication issued in counterpart European Application No. 08019680.1, mailed on May 8, 2009.

Traversat et al.: "Project JXTA 2.0 Super-Peer Virtual Network," XP002481407; http://research.sun.com/spotlight/misc/jxta.pdf; May 25, 2003; pp. 1-20.

Official Communication issued in corresponding Japanese Patent Application No. 2007-333156, mailed on Mar. 3, 2010.

Tanimoto; "Relay-Server"; U.S. Appl. No. 11/853,943, filed Sep. 12, 2007.

Tanimoto; "File Server Device"; U.S. Appl. No. 11/862,654, filed Sep. 27, 2007.

Tanimoto; "File Transfer Server"; U.S. Appl. No. 11/870,622, filed Oct. 11, 2007.

Tanimoto; "Relay Server, Relay Communication System, and Communication Device"; U.S. Appl. No. 11/944,495, filed Nov. 23, 2007.

Tanimoto; "Relay Server and Relay Communication System"; U.S. Appl. No. 11/953,505, filed Dec. 10, 2007.

Tanimoto; "Relay Server and Client Terminal"; U.S. Appl. No. 11/953,351, filed Dec. 10, 2007.

Tanimoto; "Relay Server and Relay Communication System"; U.S. Appl. No. 12/103,933, filed Apr. 16, 2008.

Tanimoto; "Relay Server and Relay Communication System"; U.S. Appl. No. 12/112,127, filed Apr. 30, 2008.

Tanimoto; "Relay Server and Relay Communication System"; U.S. Appl. No. 12/107,793, filed Apr. 23, 2008.

Official Communication issued in corresponding Japanese Patent Application No. 2007-333156, mailed on Nov. 6, 2009.

Yoshida, "A Proposal of Community-Based Information-Sharing Platform Using Distributed Servers," Proceedings of the 2007 IEICE General Conference, Mar. 20-23, 2007, p. 240.

English translation of Official Communication issued in corresponding Japanese Patent Application No. 2006-334652, mailed on Jun. 8, 2010.

English translation of Official Communication issued in corresponding Japanese Patent Application No. 2007-152122, mailed on Jun. 2, 2010.

Tanimoto, "Relay Server and Relay Communication System", U.S. Appl. No. 13/061,234, filed Feb. 28, 2011.

Tanimoto, "Relay Server, Relay Communication System, and Communication Apparatus", U.S. Appl. No. 13/061,725, filed Mar. 2, 2011.

Official Communication issued in International Patent Application No. PCT/JP2010/001594, mailed on Mar. 30, 2010.

(56) References Cited

OTHER PUBLICATIONS

Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Tanimoto, "Relay Device and Communication System", U.S. Appl. No. 11/723,466, filed Mar. 20, 2007.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "Relay Server and Relay Communication System Arranged to Share Resources Between Networks." U.S. Appl. No. 13/153,497, filed Jun. 6, 2011.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S. Appl. No. 13/496,664, filed Mar. 16, 2012.
Inai et al., "A Scalable Log Collecting Scheme for Host-Based Traffic Monitoring System," Information Processing Society of Japan Symposium Series, vol. 2008, No. 1, Jul. 2, 2008, 27 pages.
Tanimoto, "Relay Device and Communication System", U.S. Appl. No. 13/341,711, filed Dec. 30, 2011.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
Tanimoto, "First Relay Server and Second Relay Server", U.S. Appl. No. 13/255,958, filed Sep. 12, 2011.

* cited by examiner

FIG. 6

```
<?xml version="1.0" encoding="Shift_JIS" ?>
<root>
    <relay-group group-id="0001@relay-server1">                                              ←101
        <relay-account account="relay-server1@net" name="branch office A">                   ←102 (102a)
            <user-account account="client11@relay-server1.net" name="client11" group="0001" />
            <user-account account="client12@relay-server1.net" name="client12" group="0001" />
        </relay-account>
        <relay-account account="relay-server2@net" name="branch office B">                   ←102 (102b)
            <user-account account="client21@relay-server2.net" name="client21" group="0002" />
            <user-account account="client22@relay-server2.net" name="client22" group="0002" />
        </relay-account>
        <relay-account account="relay-server3@net" name="branch office C">                   ←102 (102c)
            <user-account account="client31@relay-server3.net" name="client31" group="0003" />
        </relay-account>
    </relay-group>                                                                           ←110 (110a)
    <relay-group group-id="0002@relay-server3">                                              ←101
        <relay-account account="relay-server3@net" name="branch office C">                   ←102 (102c)
            <user-account account="client31@relay-server3.net" name="client31" group="0003" />
            <user-account account="client32@relay-server3.net" name="client32" group="0003" />
        </relay-account>
    </relay-group>                                                                           ←110 (110b)
</root>
```

FIG. 7

```
<?xml version="1.0" encoding="Shift_JIS" ?>         ~121
<user-account account="client11@account">            --122
  <policy name="workspace1" policy-id="20071001150032client11@relay-server1">   123
    <family-account-info>
      <user-account account="client11@relay-server1.net"/>
      <user-account account="client12@relay-server1.net"/>      ⎫
      <user-account account="client21@relay-server2.net"/>      ⎬ 124
      <user-account account="client22@relay-server2.net"/>      ⎪
      <user-account account="client31@relay-server3.net"/>      ⎭
    </family-account-info>
    <family-resource-info>
        ......                                                    125
    </family-resource-info>
  </policy>
</user-account>
```
120

FIG. 8

```xml
<family-resource-info>
  <resource name="folderA" owner="client11@relay-server1.net" value="c:/folderA" status="ok" type="folder" date="2007/01/01 10:23:54">
    <resource name="file00ZX.xls" owner="client11@relay-server1.net" value="//network/z://folderZ/estimate.xls" type="file" date="2007/01/02 11:23:24" size="335125"/>
    <resource name="file00ZY.doc" owner="client11@relay-server1.net" value="//network/z://folderZ/order.doc" status="ok" type="file" date="2007/01/02 05:16:54" size="26123"/>
  </resource>
  <resource name="folderB" owner="client12@relay-server1.net" value="c:/folderB" status="ok" type="folder" date="2007/01/01 11:43:35">
    <resource name="file00AB.xls" owner="client12@relay-server1.net" value="//network/x://folderX/data.xls" status="ok" type="file" date="2007/01/05 08:32:26" size="112654"/>
    <resource name="file00BC.doc" owner="client12@relay-server1.net" value="//network/x://folderX/spec.doc" status="ok" type="file" date="2007/01/06 09:12:42" size="2245365"/>
  </resource>
  <resource name="folderC" owner="client21@relay-server2.net" value="c:/document" status="ok" type="folder" date="2007/01/04 11:00:14">
    <resource name="file00A.xls" owner="client21@relay-server2.net" value="c:/document/doc001.xls" status="ok" type="file" date="2007/01/09 11:22:36" size="3123457"/>
    <resource name="file00B.doc" owner="client21@relay-server2.net" value="c:/document/doc002.doc" status="ok" type="file" date="2007/01/10 15:46:21" size="4456214"/>
  </resource>
  <resource name="folderD" owner="client22@relay-server2.net" value="c:/mydocument" status="ok" type="folder" date="2007/01/02 09:53:54">
    <resource name="file0011.txt" owner="client22@relay-server2.net" value="c:/mydocument/doc0011.txt" status="ok" type="file" date="2007/01/12 19:54:23" size="11234"/>
    <resource name="file0022.txt" owner="client22@relay-server2.net" value="c:/mydocument/doc0022.txt" status="ok" type="file" date="2007/01/10 21:00:01" size="5147"/>
  </resource>
  <resource name="folderE" owner="client31@relay-server3.net" value="c:/temp" status="ok" type="folder" date="2007/01/03 12:23:54">
    <resource name="file100.pdf" owner="client31@relay-server3.net" value="c:/temp/document1.pdf" status="ok" type="file" date="2007/01/07 17:46:25" size="8456249"/>
    <resource name="file200.pdf" owner="client31@relay-server3.net" value="c:/temp/document2.pdf" status="ok" type="file" date="2007/01/08 18:19:00" size="9754123"/>
  </resource>
</family-resource-info>
```

FIG. 9

```xml
<family-resource-info>
  <resource name="folderA" owner="client11@relay-server1.net" value="c:/folderA" status="ok" type="folder" date="2007/01/01 10:23:54"/>
    <resource name="file00ZX.xls" owner="client11@relay-server1.net" value="//network/z://folderZ/ estimate .xls" status="ok" type="file" date="2007/01/03 19:06:12" size="345525"/>
    <resource name="file00ZY.doc" owner="client11@relay-server1.net" value="//network/z://folderZ/ order .doc" status="ok" type="file" date="2007/01/02 05:16:54" size="26123"/>
  </resource>
  <resource name="folderB" owner="client12@relay-server1.net" value="c:/folderB" status="ok" type="folder" date="2007/01/01 11:43:35"/>
    <resource name="file00AB.xls" owner="client12@relay-server1.net" value="//network/x://folderX/ data .xls" status="ok" type="file" date="2007/01/05 08:32:26" size="112654"/>
    <resource name="file00BC.doc" owner="client12@relay-server1.net" value="//network/x://folderX/ spec .doc" status="ok" type="file" date="2007/01/06 09:12:42" size="2245365"/>
  </resource>
  <resource name="folderC" owner="client21@relay-server2.net" value="c:/document" status="ok" type="folder" date="2007/01/04 11:00:14">
    <resource name="file00A.xls" owner="client21@relay-server2.net" value="c:/document/doc001.xls" status="ok" type="file" date="2007/01/09 11:22:36" size="3123457"/>
    <resource name="file00B.doc" owner="client21@relay-server2.net" value="c:/document/doc002.doc" status="ok" type="file" date="2007/01/10 15:46:21" size="4456214"/>
  </resource>
  <resource name="folderD" owner="client22@relay-server2.net" value="c:/mydocument" status="ok" type="folder" date="2007/01/02 09:53:54">
    <resource name="file0011.txt" owner="client22@relay-server2.net" value="c:/mydocument/doc0011.txt" status="ok" type="file" date="2007/01/12 19:54:23" size="11234"/>
    <resource name="file0022.txt" owner="client22@relay-server2.net" value="c:/mydocument/doc0022.txt" status="ok" type="file" date="2007/01/10 21:00:01" size="5147"/>
  </resource>
  <resource name="folderE" owner="client31@relay-server3.net" value="c:/temp" status="ok" type="folder" date="2007/01/03 12:23:54">
    <resource name="file100.pdf" owner="client31@relay-server3.net" value="c:/temp/document1.pdf" status="file not found" type="file" date="2007/01/07 17:46:25" size="8456249"/>
    <resource name="file200.pdf" owner="client31@relay-server3.net" value="c:/temp/document2.pdf" status="ok" type="file" date="2007/01/08 18:19:00" size="9754123"/>
  </resource>
</family-resource-info>
```

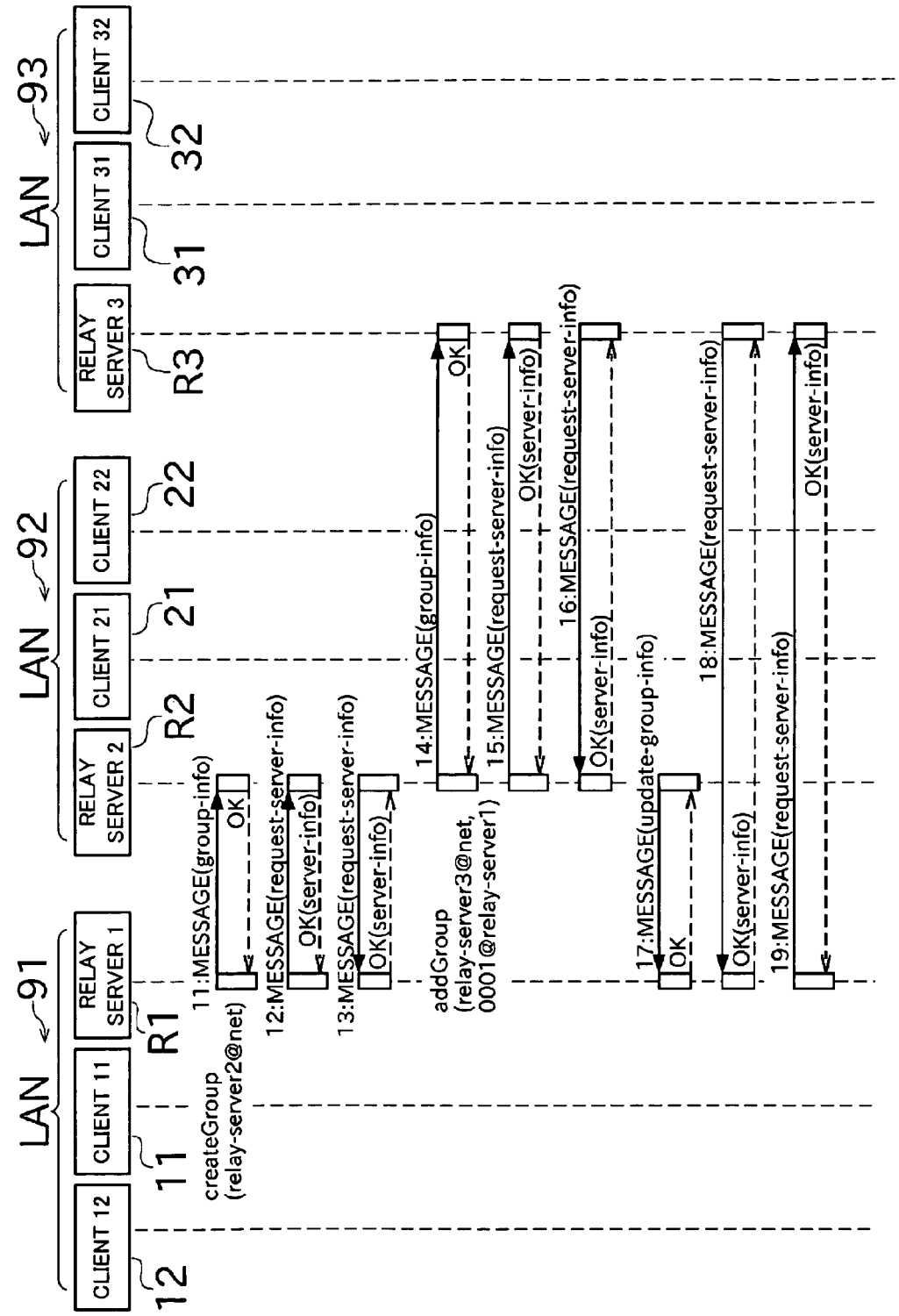

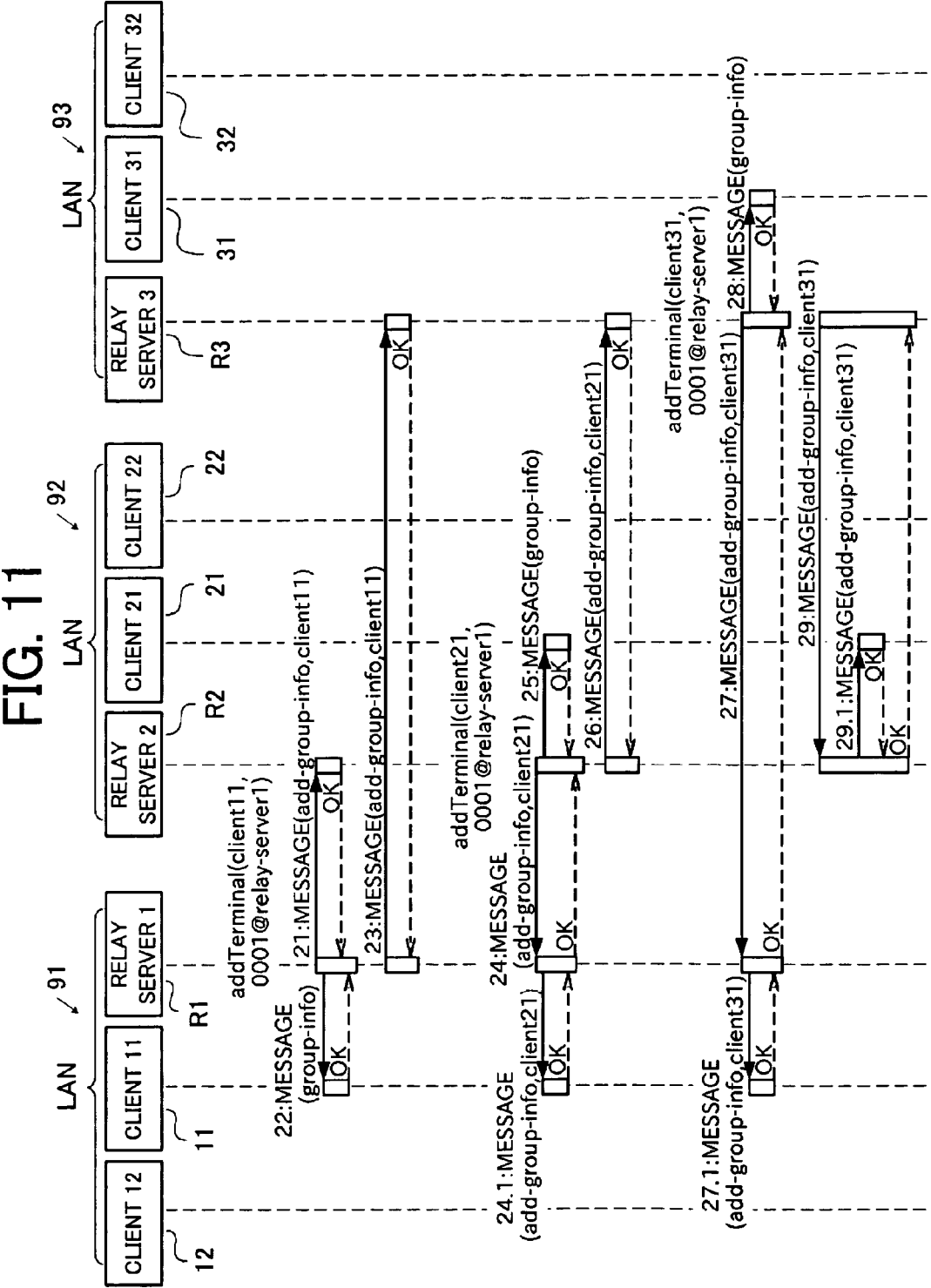

SYNCHRONIZING SHARING SERVERS

CROSS-REFERENCE TO RELATED APPLICATIONS

This application claims priority under 35 U.S.C. 119 to Japanese Patent Application No. 2007-333156, filed on Dec. 25, 2007, which application is hereby incorporated by reference in its entirety.

BACKGROUND OF THE INVENTION

1. Field of the Invention

The present invention relates to a relay server and a relay communication system that enable resource sharing via a network.

2. Description of the Related Art

A communication system referred to as a Virtual Private Network (VPN) is known in the conventional art. The VPN is used, for example, to provide communication over the Internet between terminals connected to a Local Area Network (LAN) of a plurality of branch offices (base points) established in separate regions. Through the use of the VPN, each client terminal can share various resources (such as folders, files, etc.) held by apparatuses connected to another LAN arranged in a remote location.

However, in the VPN, because the resources are shared by the apparatuses connected to the other LAN arranged in the remote location, it is extremely difficult to synchronize information related to the resources between each apparatus that shares the resources. In particular, when the apparatus that manages the resources directly changes the resources in a manner that is not via the network, the other apparatuses cannot recognize the change.

Accordingly, a technique that can easily synchronize the resources and the resource-related information shared by each apparatus connected to the network has been desired.

SUMMARY OF THE INVENTION

In order to overcome the problems described above, preferred embodiments of the present invention provide, in a system with resources that can be shared via a network, a configuration that can easily synchronize each resource with shared resource information.

A preferred embodiment of the present invention provides a relay server that includes a relay group information registration unit arranged to store relay group information, a shared resource information registration unit, and a control unit. A relay group includes at least another relay server that can be connected to the relay server. The shared resource information registration unit stores shared resource information when a resource is shared by a plurality of client terminals in the relay group. The shared resource information includes information related to the resource (i.e., resource information) and account information of the resource sharing terminals, which are the client terminals that share the resource. When an instruction to synchronize the shared resource information is received, the control unit distributes the synchronization instruction to the resource sharing terminals or to the other relay server. Further, when the resource can be handled by the resource sharing terminal that has received the synchronization instruction, the control unit instructs the resource sharing terminal to check the resource and update the shared resource information, if necessary.

In the above-described configuration, by giving one synchronization instruction to one of the servers of the relay group, all of the resource information shared by the resource sharing terminals or by the other relay server can be checked, and the shared resource information can be updated. Therefore, the resource and a content of the shared resource information can be easily matched.

In the relay server, it is preferable that the control unit distributes the synchronization instruction to each of the other relay servers, or to the resource sharing terminals that belong to the relay server, when the relay server receives the synchronization instruction given by the client terminal.

In the above-described configuration, a user operating each client terminal can transmit a synchronization instruction.

When the shared resource information is updated by the resource sharing terminal that belongs to the relay server, the relay server preferably reflects the update in at least one of the shared resource information of each of the other relay servers and the shared resource information of the resource sharing terminals that belong to the relay server.

In the above-described configuration, the relay server or the resource sharing terminals of each relay server, which are both arranged in the relay group, can automatically acquire the latest shared resource information. Accordingly, the shared resource information of an entire network can be synchronized.

The resource sharing terminal that has received the synchronization instruction preferably checks whether or not the resource that can be handled by the resource sharing terminal exists. When the resource does not exist, the resource sharing terminal deletes the corresponding resource information from the shared resource information, and updates the shared resource information.

In the above-described configuration, when the resource is deleted, the corresponding resource information can be automatically deleted from the shared resource information. Accordingly, a sharing of the non-existent resource can be prevented.

The shared resource information registration unit can preferably register a plurality of shared resource information. When the plurality of shared resource information includes the information related to the non-existent resource, the relay server deletes the corresponding resource information from each of the shared resource information, and updates the shared resource information.

The "deletion of the resource information" includes, in addition to the deletion of the resource information from the shared resource information, a recording of such resource deletion as the resource information.

In the above-described configuration, the plurality of shared resource information can be updated by one synchronization instruction.

It is preferable that, in the relay server, a synchronization instruction with respect to a certain resource of the shared resource information can be distributed.

In the above-described configuration, the synchronization with respect to the certain resource can be performed. Moreover, since the target resource of the synchronization is determined in advance, processes can be efficiently performed.

Another preferred embodiment of the present invention provides a relay communication system that includes a plurality of relay servers and a plurality of client terminals. The relay server includes a relay group information registration unit arranged to store relay group information, a shared resource information registration unit, and a control unit. A relay group includes at least another relay server that can be connected to the relay server. The shared resource information registration unit stores shared resource information when the plurality of client terminals shares a resource in the relay group. The shared resource information includes information related to the resource (i.e., resource information) and account information of the resource sharing terminals, which are the client terminals that share the resource. When an instruction to synchronize the shared resource information is received, the control unit distributes the synchronization instruction to the resource sharing terminals or to the other relay server. Furthermore, when the resource can be handled by the resource sharing terminal that has received the synchronization instruction, the control unit instructs the resource sharing terminal to check the resource, and, if necessary, update the shared resource information.

The above-described configuration achieves a relay communication system in which resource information in the shared resource information and the shared resource can be easily synchronized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 6 illustrates a content of relay group information according to a preferred embodiment of the present invention.

FIG. 7 illustrates a content of shared resource information according to a preferred embodiment of the present invention.

FIG. 8 illustrates a detailed content of family resource information of the shared resource information according to a preferred embodiment of the present invention.

FIG. 9 illustrates the family resource information having the content updated by a synchronization instruction according to a preferred embodiment of the present invention.

FIG. 10 is a sequence chart illustrating a communication process that creates a relay group according to a preferred embodiment of the present invention.

FIG. 11 is a sequence chart illustrating a communication process that registers the client terminal in the relay group as a resource sharable terminal according to a preferred embodiment of the present invention.

DETAILED DESCRIPTION OF PREFERRED EMBODIMENTS

Figure 1:
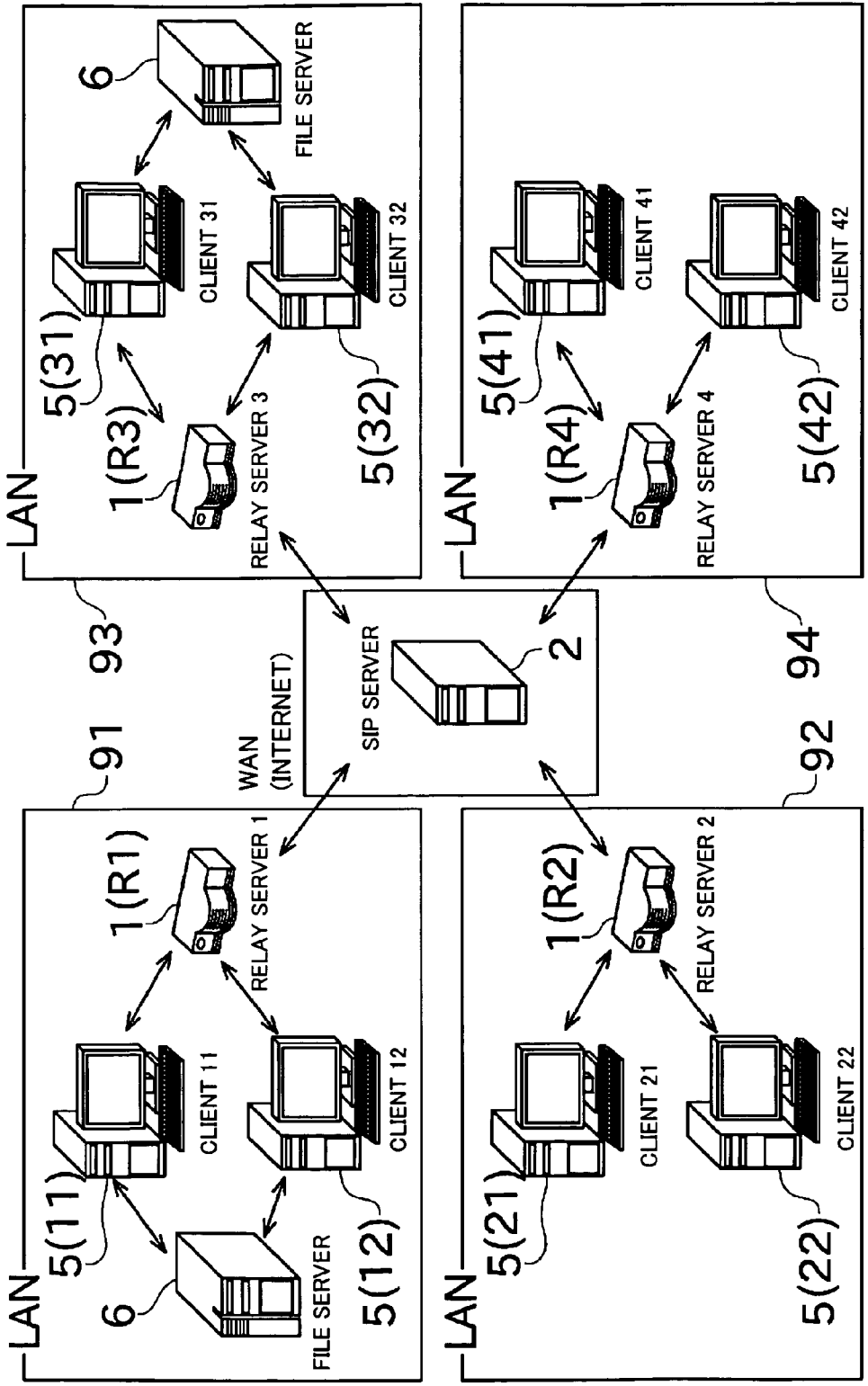
FIG. 1 is a network configuration diagram of a relay communication system according to a preferred embodiment of the present invention.

Preferred embodiments of the present invention will be described with reference to the drawings. FIG. 1 illustrates an overall configuration of a relay communication system according to a preferred embodiment of the present invention.

As illustrated in FIG. 1, the relay communication system of the present preferred embodiment includes a plurality of LANs connected to a Wide Area Network (WAN). The relay communication system includes relay servers 1, an external server 2, client terminals 5, and file servers 6, etc.

The WAN is a network that connects different LANs to each other. In the present preferred embodiment, the Internet is preferably used as the WAN, for example.

The LAN is a relatively small-scale network provided in a limited location. There are a plurality of LANs, each of which is provided at a physically remote location. In the present preferred embodiment, a LAN 91 is provided at, for example, a Tokyo branch office, and LANs 92, 93, 94 are respectively provided at, for example, an Osaka branch office, a Nagoya branch office, and a Fukuoka branch office. The four LANs 91, 92, 93, 94 are respectively connected to the Internet, which is a global network.

Figure 2:
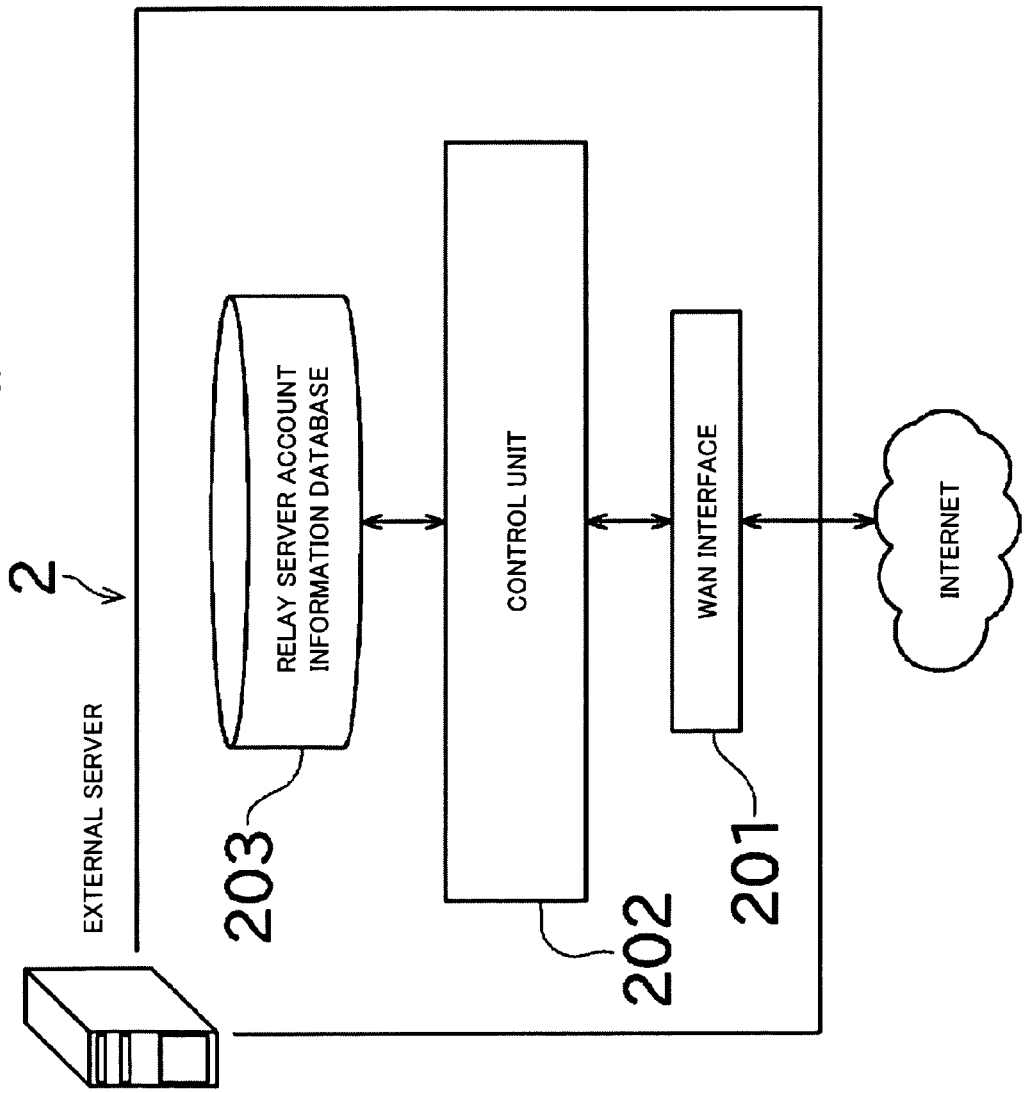
FIG. 2 is a functional block diagram of an external server according to a preferred embodiment of the present invention.

The external server 2 will now be described with reference to FIG. 2, etc. FIG. 2 is a functional block diagram of the external server 2. The external server 2 is a device that facilitates the communication performed between the relay servers 1 each arranged in the respective LANs, and the Internet.

The external server 2 illustrated in FIG. 2 includes a function of a Session Initiation Protocol (SIP) server. Specifically, the external server 2 includes a function of an SIP proxy server for relaying SIP methods and responses, etc., and a function of an SIP registrar server for registering an account of the relay server 1.

As illustrated in FIG. 2, the external server 2 preferably includes a WAN interface 201, a control unit 202, and a relay server account information database 203 as a primary configuration.

The WAN interface 201 is an interface arranged to communicate with each device, such as the relay server 1 connected to the Internet, by using a global IP address.

The relay server account information database 203 is a database that manages, in association with the global IP address, the account of the relay server 1 that has made a registration request.

The control unit 202 is a processing unit that controls various communications performed through the WAN interface 201, and controls communication processes complying with protocols such as Transmission Control Protocol/Internet Protocol (TCP/IP), User Datagram Protocol (UDP) and SIP. The control unit 202 performs, for example, a process of receiving the account of the relay server 1 from each relay server 1 and a process of registering the received account in the relay server account information database 203. Moreover, the control unit 202 performs, for example, a process of relaying communication data, such as various SIP methods and responses transmitted from the relay server 1, to other relay servers 1.

The client terminal 5 will now be described with reference to FIG. 3, which is a functional block diagram of the client terminal 5.

The client terminal 5 is a terminal that can be directly operated by a user, and includes a Personal Computer (PC) or other similar devices used by the user, for example, on a daily basis. Accordingly, a great number of client terminals 5 typically exist in the LAN. In the present preferred embodiment, as illustrated in FIG. 1, client terminals 11, 12 are connected to the LAN 91, client terminals 21, 22 are connected to the LAN 92, client terminals 31, 32 are connected to the LAN 93, and client terminals 41, 42 are connected to the LAN 94. A private IP address uniquely managed in the same LAN is provided for each client terminal 5.

Figure 3:
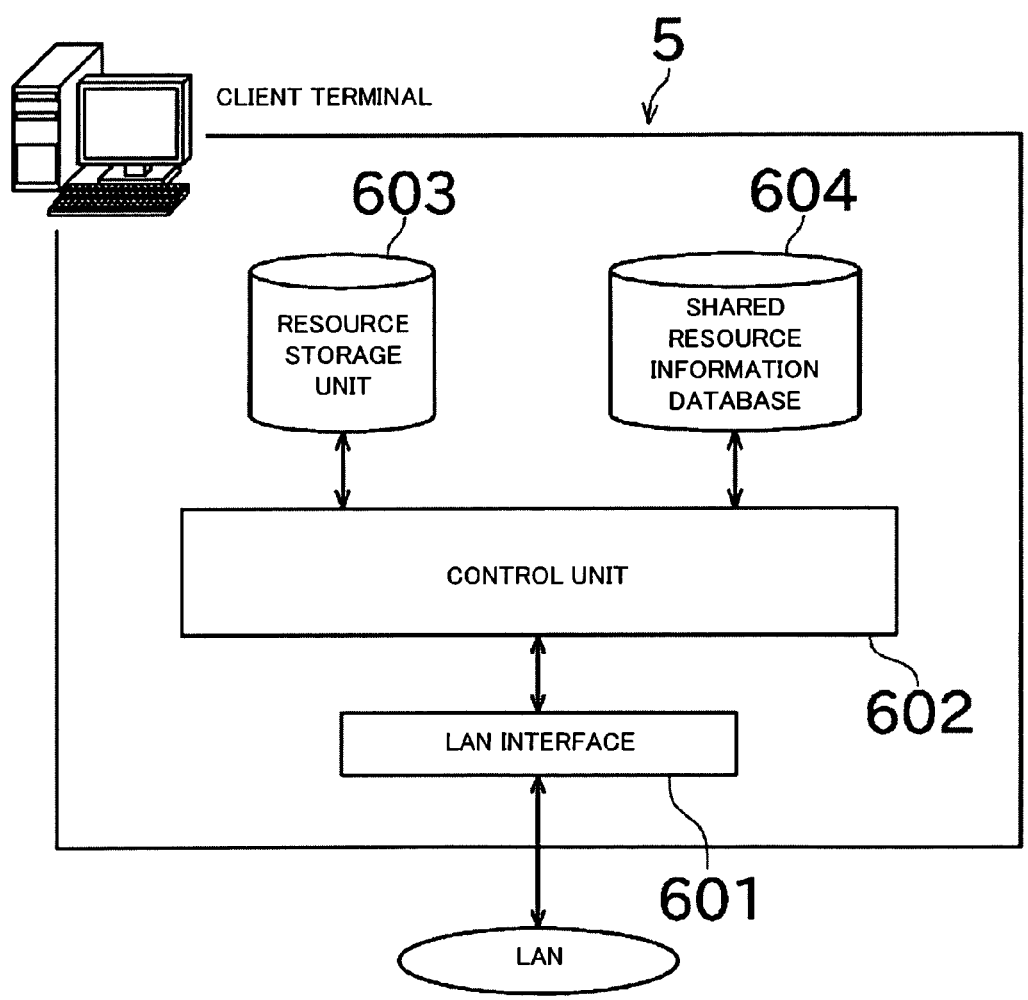
FIG. 3 is a functional block diagram of a client terminal according to a preferred embodiment of the present invention.

As illustrated in FIG. 3, the client terminal 5 preferably includes a LAN interface 601, a control unit 602, a resource storage unit 603, and a shared resource information database 604 as a primary configuration.

The LAN interface 601 is an interface arranged to communicate with each apparatus, such as the relay server 1 and the file server 6 connected to the same LAN, by using the private IP address.

The resource storage unit 603 stores resources, such as files, folders, etc., that can be handled by the client terminal 5.

The shared resource information database 604 stores shared resource information held by each client terminal 5.

The control unit 602 is a processing unit that controls various communications performed through the LAN interface 601. The control unit 602 controls communication processes complying with protocols such as TCP/IP, UDP, and SIP.

The control unit 602 performs, for example, a process of controlling the handling such as movement (transfer), change, deletion, etc., of the resources stored in the resource storage unit 603. The control unit 602 also performs a process of updating the shared resource information stored in the shared resource information database 604 when a change notification of the shared resource information is received from the relay server 1.

The relay server 1 will now be described with reference to FIG. 4, which is a functional block diagram showing the components of each relay server 1.

As illustrated in FIG. 1, one relay server 1 is arranged in each LAN. Specifically, a relay server R1 is arranged in the LAN 91, a relay server R2 is arranged in the LAN 92, a relay server R3 is arranged in the LAN 93, and a relay server R4 is arranged in the LAN 94.

The relay server 1 is connected to the LAN, and can communicate with each client terminal 5 that is connected to the same LAN. The relay server 1 is also connected to the Internet, and can communicate with the relay servers 1 that are connected to the other LANs (through the external server 2). In order to permit such communication, each relay server 1 is provided with both a private IP address and a global IP address.

Figure 4:
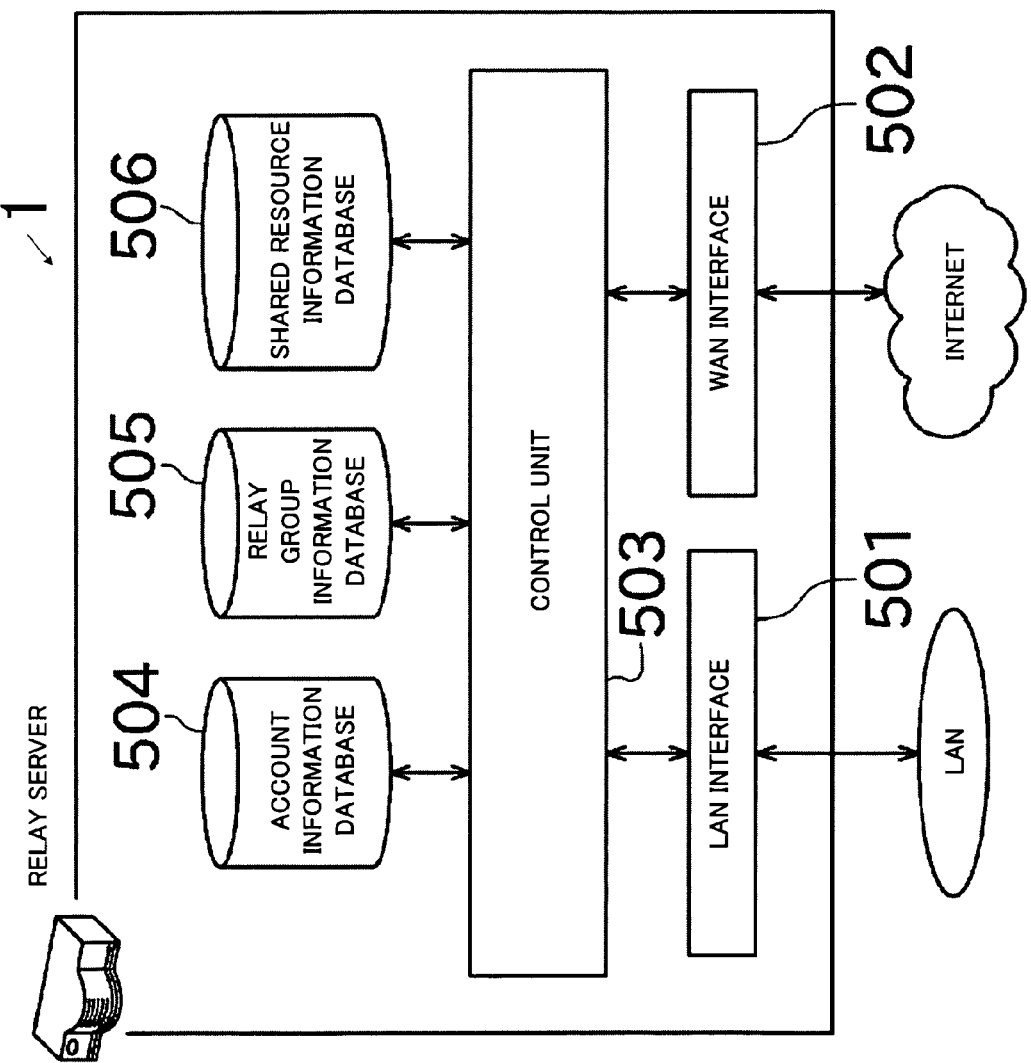
FIG. 4 is a functional block diagram of a relay server according to a preferred embodiment of the present invention.

As illustrated in FIG. 4, the relay server 1 preferably includes a LAN interface 501, a WAN interface 502, a control unit 503, an account information database 504, a relay group information database 505, and a shared resource information database 506 as a primary configuration.

The LAN interface 501 is an interface arranged to communicate with the client terminal 5 connected to the same LAN (i.e., the LAN to which the relay server 1 is connected), by using the private IP address. For example, the relay server R1 can communicate with each of the client terminals 11, 12 in the LAN 91 by using the LAN interface 501.

The WAN interface 502 is an interface arranged to communicate with each apparatus such as the external server 2 connected to the Internet, by using the global IP address.

Each relay server 1 includes a function of an SIP registrar server, and communicates with each client terminal 5 by using a SIP. For example, in the LAN 92, the relay server R2 functions as a SIP registrar server, receives an account of each client terminal 21, 22 connected to the LAN 92, and registers the received accounts in the account information database 504.

Figure 5:
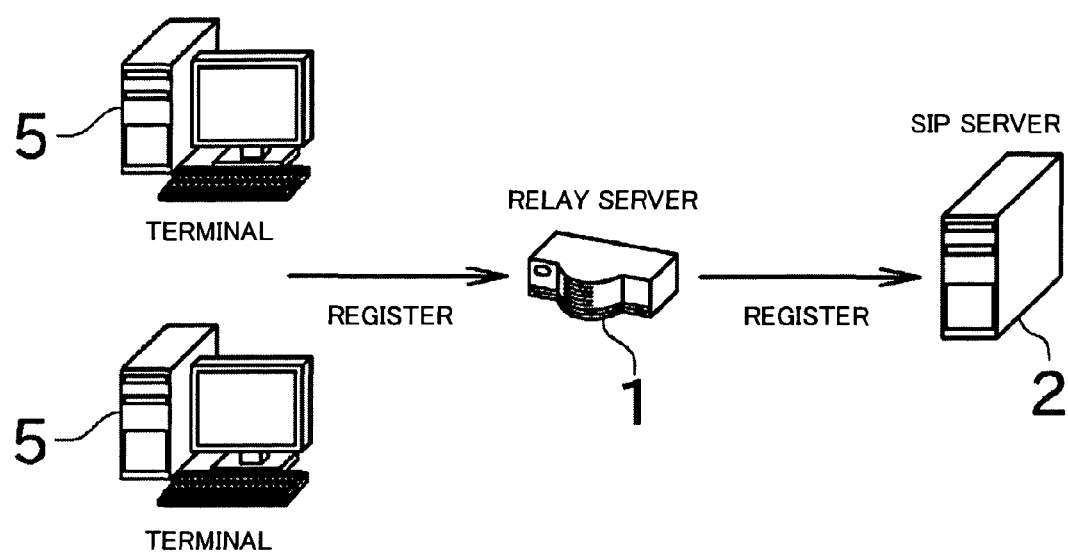
FIG. 5 illustrates the relationship between the client terminal, the relay server, and the external server according to a preferred embodiment of the present invention.

Accordingly, as illustrated in FIG. 5, in the relationship with the client terminal 5, the relay server 1 functions as a server that receives the account from the client terminal 5 and registers (REGISTER) the account. In the relationship with the external server 2, the relay server 1 functions as a client that transmits the account to the external server 2 and registers (REGISTER) the account.

The account information database 504 of FIG. 4 is a database that manages, in association with the private IP address, the account of the client terminal 5 that has made a registration request.

The relay group information database 505 is preferably a database that manages relay group information related to the client terminal 5 registered in the account information database 504.

The shared resource information database 506 is preferably a database that manages the shared resource information related to the client terminal 5 registered in the account information database 504.

The control unit 503 is preferably a processing unit that controls various communications performed through the LAN interface 501 and the WAN interface 502, and controls various communication processes complying with protocols such as TCP/IP, UDP, SIP, etc.

For example, the control unit 503 performs a process of transmitting an account thereof to the external server 2 and requesting registration of the account, and a process of creating the relay group information to store in the relay group information database 505. The control unit 503 also performs a process of creating the shared resource information to store in the shared resource information database 506.

The file server 6 will now be described. As illustrated in FIG. 1, the file server 6 is connected to the LAN, and can communicate with each client terminal 5 connected to the same LAN.

The file server 6 can store resources such as files, folders, etc., and functions as a resource storage unit alternative to the resource storage unit 603 (shown in FIG. 3) of each client terminal 5. In other words, in the present preferred embodiment, the resource that can be handled by each client terminal 5 may be stored in a local disc of the client terminal 5, and/or may be stored in the file server 6 provided as a network drive. The file server 6 is not necessarily required in each LAN, and the installation thereof is omitted in the LANs 92 and 94 (shown in FIG. 1).

The relay group information and the shared resource information, which are information handled in the relay communication system of the present preferred embodiment, will now be described.

First, the relay group information will be described with reference to FIG. 6, which illustrates an example of content of the relay group information.

FIG. 6 illustrates an example of the storage content of the relay group information database 505 of the relay server R3. In this example, the relay group information database 505 stores relay group information 100a and 100b.

The relay group information 100a and 100b includes group identification information 101, information (relay account information) 102 of the relay server 1 that forms a relay group by enabling connection with one another, and resource sharable terminal information 110.

The group identification information 101 is used to identify the corresponding relay group information 100, and is given a different identification ID each time the relay group information 100 is created, so as to be uniquely identified. Thus, an operator (or the user) can specify the relay group based on the group identification information 101 and easily change a group configuration.

The relay account information 102 includes information about the account of each relay server 1 that forms a relay group by enabling the connection with one another. For example, in the relay group information 100a illustrated on an upper side of FIG. 6, the accounts of the relay servers R1, R2, and R3 that form a relay group are described. In the relay group information 100b illustrated on a lower side of FIG. 6, the account of the relay server R3 that forms another relay group is described.

A specific name that is given to the account of each relay server 1 is also registered in the relay account information 102 so as to allow the user to identify easily. For example, in the relay account information 102a of the relay server R1 (relay server 1), a name (branch office A) is given to the account (relay-server1@net) of the relay server R1.

As described above, the relay group information 100a and 100b are created such that they can be uniquely identified with respect to each relay group. The relay group information 100a and 100b include the account (relay account information 102) of each relay server that forms a group (relay group) by enabling the connection with one another. Accordingly, by referring to the relay group information 100a and 100b, the operator or the user can recognize which LANs form a group.

Next, resource sharable terminal information 110 that can be included in the relay group information 100 will be described.

As illustrated in FIG. 6, the resource sharable terminal information 110 is registered in association with each piece of relay group information 100. For example, resource sharable terminal information 110a is registered in association with the relay group information 100a, and resource sharable terminal information 110b is registered in association with the relay group information 100b.

Each of the resource sharable terminal information 110a and 110b includes individual terminal information 111 that describes the client terminal 5 that can share the resource in the respective relay groups in the relay group information 100a and 100b. The individual terminal information 111 describes the account of each client terminal 5 that can share the resource.

For example, the relay group information 100a corresponding to the resource sharable terminal information 110a illustrated on the upper side of FIG. 6 defines the relay group that is formed by the relay servers R1, R2, and R3. As illustrated in FIG. 1, the client terminals 11 and 12 are arranged in the LAN 91 to which the relay server R1 is connected. In the example of the resource sharable terminal information 110a illustrated on the upper side of FIG. 6, the two client terminals 11 and 12 are selected as the terminals that can share the resource in the relay group, and account information thereof is registered as the individual terminal information 111. Similarly, the client terminals 21 and 22 are selected as the resource sharable terminals in the LAN 92 to which the relay server R2 is connected. Although the client terminals 31 and 32 are arranged in the LAN 93 to which the relay server R3 is connected, in the example of the resource sharable terminal information 110a, only the client terminal 31 is selected as the resource sharable terminal, and account information thereof is registered as the individual terminal information 111.

The relay group information 100b corresponding to the resource sharable terminal information 110b illustrated on the lower side of FIG. 6 defines the relay group formed by only the relay server R3. In the example of the resource sharable terminal information 110b, the two client terminals 31 and 32 are selected as the resource sharable terminals in the LAN 93 to which the relay server R3 is connected, and account information thereof is registered as the individual terminal information 111.

In addition to the account of each resource sharable terminal, a specific name given to the account is registered in the individual terminal information 111 so as to be easily identified by the user. For example, in the case of client terminal 11, a name (client 11) given to the account thereof (for example, client11@relay-server1.net) is described. Moreover, belonging identification data 112 indicating belonging of the resource sharable terminal, such as a sales division and a development division, is described in the individual terminal information 111.

In the resource sharable terminal information 110, each individual terminal information 111 is described in association with the relay account information 102 of the relay server connected to the LAN to which the resource sharable terminals are connected. For example, the individual terminal information 111 related to the client terminal 11 is described in association with the relay account information 102a of the relay server R1.

As illustrated in FIG. 6, the relay group information database 505 can store a plurality of relay group information 100 and a plurality of resource sharable terminal information 110. The client terminal 31 is the resource sharable terminal in both the resource sharable terminal information 110a and 110b of the two relay groups, and the individual terminal information 111 thereof is described. Accordingly, one client terminal 5 can be selected as the resource sharable terminal in a plurality of relay groups, and the resource sharable terminal information 110 indicating that the one client terminal may be the resource sharable terminal in the plurality of relay groups can be stored in the relay group information database 505.

Each piece of relay group information 100 is exchanged between each relay server 1 that forms the relay group. For example, the relay group information 100a illustrated on the upper side of FIG. 6 is exchanged among the three relay servers R1, R2, and R3, and is stored in the relay group information database 505 of each relay server R1, R2, and R3. The relay group information 100b illustrated on the lower side of FIG. 6 is held only by the relay server R3, and is stored in the relay group information database 505 of the relay server R3.

The content of the shared resource information will now be described with reference to FIGS. 7 through 9. FIG. 7 illustrates an example of shared resource information 120 stored in the shared resource information database 604 of the client terminal 11. The shared resource information 120 is also stored in the shared resource information database 506 of the relay server R1 connected to the same LAN to which the client terminal 11 is connected.

The shared resource information 120 includes account identification information 121 indicating that the information 120 is the shared resource information related to the client terminal 11 and individual shared resource information 122 related to the client terminal 11.

Since the shared resource information 120 is created with respect to each client terminal 5, the account identification information 121 is used to identify the created shared resource information 120.

The individual shared resource information 122 includes shared resource identification information 123, family account information 124, and family resource information 125, etc.

The shared resource identification information 123 is used to identify the individual shared resource information 122 thereof, and can be uniquely identified by being given a different ID each time the individual shared resource information 122 is created. The shared resource identification information 123 includes (1) an ID that is associated with the client terminal 5 that has made a request for creating the shared resource information 120 and (2) a name that is used to identify the ID easily. For example, the ID may be "20071001150032client11@relay-server1" or the like, and the name for easily performing the identification may be "workspace1", or the like.

Thus, the user etc. can specify the individual shared resource information 122 based on the shared resource identification information 123, and thus can edit the content of the individual shared resource information 122 easily.

FIG. 8 illustrates the detailed content of the family resource information 125 of FIG. 7. As illustrated in FIG. 8, the family resource information 125 includes collections of resource information 126 indicating resources such as files and folders held by the client terminal 5.

In each resource information 126, name information of a shared resource, account information of the client terminal 5 (owner client terminal) that can handle the resource, address information indicating the whereabouts of the resource, status information of the resource, and detailed information of the resource are described.

A name of the shared resource is given to the resource when the resource is shared by a plurality of client terminals 5, and may be described as follows, for example: name="folderA". In the account information of the owner client terminal, an account for identifying the owner client terminal is described as follows, for example: owner="client11@relay-server1.net". An address indicating the whereabouts of the resource indicates the location in which the shared resource is actually stored in the resource storage unit 603 (or the file server 6), and may be described by using a full path as follows, for example: value="c:/folderA". The status information indicates the status of the resource, and is described as follows, for example: status="OK". The detailed information of the resource indicates a time stamp or a file size (byte-by-byte), and describes the time stamp as follows, for example: date="2007/01/01 10:23:54".

The family account information 124 of FIG. 7 includes collections of information of accounts (for example, client11@relay-server1.net) of the client terminals 5 that share the resource indicated in the family resource information 125.

In the example of family resource information 125a of FIG. 8, the owner client terminal is the client terminal 11. The client terminals (user client terminals) that can handle the resource indirectly via the owner client terminal 11 are the client terminals other than the owner client terminal 11 that are described in the family account information 124. In other words, in this example, the client terminals 12, 21, 22, and 31 are the user client terminals.

As illustrated in FIG. 8, a plurality of family resource information 125 can be described, and the owner client terminal described in each family resource information 125 may be different from one another. Accordingly, the relationship between the owner client terminal and the user client terminals is not fixed, and any client terminal described in the family account information 124 may be the owner client terminal. In the following description, the client terminal described in the family account information 124 may be referred to as a sharing member terminal.

Each of the client terminals 11, 12, 21, 22, and 31, which are the sharing member terminals in the example of FIG. 7, is connected to the LAN to which any of the relay servers R1, R2, and R3, which form the relay group described in the relay group information 100a of FIG. 6, is connected. In the resource sharable terminal information 110a of the relay group, each sharing member terminal corresponds to the client terminal that has the individual terminal information 111 thereof described as the resource sharable terminal.

Each sharing member terminal stores, in the shared resource information database 604, the shared resource information 120 including the individual shared resource information 122 having the above-described content.

With reference to FIG. 9, a case will be described in which the shared resource information 120 is updated in response to the synchronization of the resource and the family resource information 125. FIG. 9 illustrates an example of a case in which the contents of family resource information 125a to 125e of family resource information (FIG. 8) included in the shared resource information 120 of FIG. 7 are updated.

The family resource information 125a of FIG. 9 illustrates an example in which a file (i.e., the resource located in "//network/z://folderZ/estimate.xls") that is named "file00ZX.xls" at the time of sharing is updated when the user operates the client terminal 11. More specifically, since the content of the file is updated, a portion (indicating the time stamp and file size information) surrounded by a rectangle of the family resource information 125a is updated from the state of FIG. 8 in response to the synchronization with the file.

The family resource information 125e of FIG. 9 illustrates an example of a file (i.e., the resource located in "c:/temp/document1.pdf") that is named "file100.pdf" at the time of sharing is deleted when the user operates the client terminal 31.

In the example of FIG. 9, accompanying the deletion of the resource "file100.pdf", the status information of the resource information is rewritten. That is, a portion surrounded by a rectangle of the family resource information 125e is rewritten to status="file not found".

When the resource is deleted, instead of recording in the status information that the file has been deleted, the resource information 126 related to "file100.pdf" may be deleted from the shared resource information 120.

When the family resource information 125 is rewritten as described above, the rewritten resource information 125 is distributed to the other sharing member terminals. Thus, based on a time stamp, file size information, and status information of the rewritten family resource information 125, the other sharing member terminals can reliably detect that the resource has been changed or deleted.

With reference to sequence numbers 11 through 19 of FIG. 10, generation steps and registration steps of the relay group will be described. Processes of sequence numbers 11 through 19 of FIG. 10 are performed as initial settings of the network by the user and operator.

First, in the relay server R1, a method (createGroup method) that newly forms a relay group with the relay server R2 is executed by the operator. In the createGroup method, an account (relay-server2@net) of the relay server R2 with which the relay group is formed is specified.

Accordingly, the relay group information 100a is newly created in the relay server R1. At this time, an identification ID (0001@relay-server1) is given to the corresponding relay group information, and described in the group identification information 101.

Then, a message transmission command (MESSAGE method) is executed in the relay server R1, and a "group-info message" with respect to the relay server R2 is transmitted to the external server 2 (sequence number 11). The message includes the identification ID of the relay group information created in the "createGroup method", or the like.

An account (sip:relay-server2@net) of the relay server R2, which is a message transmission destination, is specified in the MESSAGE method. By referring to the relay server account information database 203, the external server 2 acquires the global IP address of the relay server R2, and relays the "group-info message" from the relay server R1 to the relay server R2. Having received the message, the relay server R2 returns an "OK" response to the relay server R1 via the external server 2.

As described above, the communication between each relay server 1 in the present preferred embodiment is performed via the external server 2, and the same is applied to the following description. Accordingly, in the following description, specific descriptions of the communication process performed via the external server 2 will be omitted.

Next, the relay server R1 transmits a message requesting transmission of server information (request-server-info message) to the relay server R2 (sequence number 12). Having received the message, the relay server R2 returns an "OK" response and information (server-info) related thereto to the relay server R1.

Conversely, the relay server R2 transmits a "request-server-info message" to the relay server R1 (sequence number 13), and the relay server R1 returns information (server-info) related thereto to the relay server R2.

Thus, by exchanging each of the server information, both the information related to the relay server R1 and the information related to the relay server R2 are described in the relay account information 102 of the relay group information 100, and are stored in the relay group information database 505 of each relay server R1 and R2.

Next, a method (addGroup method) in which the relay server R3 is newly added to the previously created relay group (i.e., the relay group formed by the relay servers R1 and R2) is performed in the relay server R2 by the operator. An account (relay-server3@net) of the relay server R3 to be added and the identification ID (0001@relay-server1) of the relay group to which the relay server R3 will be added are specified in the "addGroup method".

Then, the relay server R2 transmits a "group-info message" to the relay server R3 to be added (sequence number 14). The message includes the identification ID of the relay group specified in the "addGroup method", or the like. Having received the message, the relay server R3 returns an "OK" response to the relay server R2. Then, similarly to the descriptions in sequence numbers 12, 13, server information is exchanged between the relay servers R2 and R3 (sequence numbers 15, 16).

The relay server R2 transmits, to the relay server R1, an "update-group-info message" notifying that the relay server R3 has been added to the relay group (sequence number 17). Having received the message, the relay server R1 returns an "OK" response to the relay server R2. Then, the server information is exchanged between the relay servers R3 and R1 (sequence numbers 18, 19).

Thus, the relay group information 100 (i.e., information having the content of relay group information 100a of FIG. 6) indicating that the relay servers R1, R2, and R3 form the relay group is stored in the relay group information database 505 of each relay server R1, R2, and R3.

Although not illustrated in FIG. 10, the "createGroup method" is further executed in the relay server R3 without specifying the other relay servers that form the relay group. As a result, the relay group information 100b formed only by the relay server R3 is created, and an identification ID (0002@relay-server2) is given and stored in the relay group information database 505 of the relay server R3.

Next, with reference to sequence numbers 21 through 29 of FIG. 11, registration steps of the resource sharable terminals with respect to the relay group will be described.

In the relay server R1, a method (addTerminal method) in which the client terminal 11 is registered as the resource sharable terminal in the relay group formed by the relay servers R1, R2, and R3 is executed by the operator. The account and the identification ID (0001@relay-server1) indicating the registration destination relay group, both of which are of the client terminal 11, are specified in the "addTerminal method".

When the "addTerminal method" is executed, the relay server R1 searches the relay group information database 505 thereof. Then, the relay server R1 adds the individual terminal information 111 of the client terminal 11 to the resource sharable terminal information 110 that corresponds to the relay group information of the specified identification ID.

Then, the relay server R1 immediately specifies the relay group information 100 from the storage content of the relay group information database 505 by using the identification ID, and searches for the relay servers 1 that form the relay group. As a result, it is determined from the relay group information 100a of FIG. 6 that the relay group is formed by the relay servers R1, R2, and R3.

Accordingly, the relay server R1 transmits, to the relay server R2, an "add-group-info message" requesting for addition of the resource sharable terminal to the relay group (sequence number 21). The message includes the account of the client terminal 11 to be added and the identification ID of the registration destination relay group, or the like. Having received the message, the relay server R2 adds the individual terminal information 111 of the client terminal 11 to the resource sharable terminal information 110 stored in the relay group information database 505, and then returns an "OK" response.

Then, the relay server R1 transmits a "group-info message" to the client terminal 11 (sequence number 22). The message includes the resource sharable terminal information 110 to which the individual terminal information 111 of the client 11 is added. Having received the message, the client terminal 11 then stores the content of the received resource sharable terminal information 110 in a suitable storage unit.

Subsequently, the relay server R1 also transmits, to the relay server R3, the "add-group-info message" requesting the addition of the resource sharable terminal to the relay group (sequence number 23). Having received the message, the relay server R3 then adds the individual terminal information 111 of the client terminal 11 to the resource sharable terminal information 110 stored in the relay group information database 505, and then returns an "OK" response.

Thus, the individual terminal information 111 of the client terminal 11 is registered as the resource sharable terminal in the resource sharable terminal information 110 of the relay group information 100 stored in the relay group information database 505 of each relay server R1, R2, and R3.

Next, in the relay server R2, a method (addTerminal method) in which the identification ID of the relay group is specified, and the client terminal 21 is registered as the resource sharable terminal is executed by the operator.

The relay server R2 searches the relay group information database 505 thereof, and adds the individual terminal information 111 of the client terminal 21 to the resource sharable terminal information 110 that corresponds to the relay group information specified by using the identification ID.

Then, the relay server R2 transmits, to the relay server R1, an "add-group-info message" requesting for addition of the resource sharable terminal to the relay group (sequence number 24). The message includes an account of the client terminal 21 to be added and the identification ID of the registration destination relay group, or the like.

Having received the message, the relay server R1 adds the individual terminal information 111 of the client terminal 21 to the resource sharable terminal information 110 stored in the relay group information database 505. Further, the relay server R1 transmits an "add-group-info message" to the client terminal 11, which is connected to the same LAN and is stored as the resource sharable terminal (sequence number 24.1). Having received the message, the client terminal 11 stores the individual terminal information 111 of the client terminal 21 in a suitable storage unit. Then, the client terminal 11 returns an "OK" response to the relay server R1. Having received the response, the relay server R1 returns an "OK" response to the relay server R2.

Furthermore, the relay server R2 transmits a "group-info message" to the client terminal 21 (sequence number 25). The message includes the resource sharable terminal information 110 to which the individual terminal information 111 of each client terminal 11 and 21 is added. Having received the message, the client terminal 21 stores the content of the received resource sharable terminal information 110 in a suitable storage unit.

Subsequently, the relay server R2 also transmits, to the relay server R3, the "add-group-info message" requesting for addition of the resource sharable terminal to the relay group (sequence number 26). Having received the message, the relay server R3 adds the individual terminal information 111 of the client terminal 21 to the resource sharable terminal information 110 stored in the relay group information database 505, and then returns an "OK" response.

Thus, the individual terminal information 111 of each client terminal 11 and 21 has been registered as the resource sharable terminals in the resource sharable terminal information 110 of the relay group information 100 stored in the relay group information database 505 of each relay server R1, R2, and R3.

Next, in the relay server R3, a method (addTerminal method) in which the identification ID of the relay group is specified and the client terminal 31 is registered as the resource sharable terminal is executed by the operator.

The relay server R3 searches the relay group information database 505 thereof, and adds the individual terminal information 111 of the client terminal 31 to the resource sharable terminal information 110 related to the relay group specified by using the identification ID.

Further, the relay server R3 transmits, to the relay server R1, an "add-group-info message" requesting for addition of the resource sharable terminal to the relay group (sequence number 27). The message includes an account of the client terminal 31 to be added and the identification ID of the registration destination relay group, or the like.

Having received the message, the relay server R1 adds the individual terminal information 111 of the client terminal 31 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 27.1). Having received the message, the client terminal 11 stores the individual terminal information 111 of the client terminal 31 in a suitable storage unit. Then, the client terminal 11 returns an "OK" response to the relay server R1. Having received the response, the relay server R1 returns an "OK" response to the relay server R3.

Then, the relay server R3 transmits a "group-info message" to the client terminal 31 (sequence number 28). The message includes the resource sharable terminal information 110 to which the individual terminal information 111 of the client terminal 31 is added. Having received the message, the client terminal 31 stores the content of the received resource sharable terminal information 110 in a suitable storage unit.

Then, the relay server R3 also transmits, to the relay server R2, the "add-group-info message" requesting for the addition of the resource sharable terminal to the relay group (sequence number 29). Having received the message, the relay server R2 adds the individual terminal information 111 of the client terminal 31 to the resource sharable terminal information 110 stored in the relay group information database 505. Further, the relay server R2 transmits the "add-group-info message" to the client terminal 21, which is connected to the same LAN and has already been stored as the resource sharable terminal (sequence number 29.1). Having received the message, the client terminal 21 stores the individual terminal information 111 of the client terminal 31 in a suitable storage unit. Then, the client terminal 21 returns an "OK" response to the relay server R2. Having received the response, the relay server R2 returns an "OK" response to the relay server R3.

Thus, the individual terminal information 111 of each client terminal 11, 21, 31 as the resource sharable terminal is registered in the resource sharable terminal information 110 of the relay group information 100 stored in the relay group information database 505 of each relay server R1, R2, and R3.

Although not illustrated in FIG. 11, an operation of adding the client terminals 12 and 22 to the relay group information (having the identification ID "0001@relay-server1") is further performed. As a result, the individual terminal information 111 of each client terminal 11, 12, 21, 22, and 31 as the resource sharable terminal is registered in the resource sharable terminal information 110 of the relay group information 100 (refer to reference numeral 110a of FIG. 6). Furthermore, in the relay server R3, an operation of adding the client terminals 31 and 32 to another relay group information (having the identification ID "0002@relay-server2") is subsequently performed.

The process of registering the client terminals as the resource sharable terminals has been described in FIG. 11. The relay server 1 can also perform a process ("deleteTerminal method") of unregistering the client terminal 5 as the resource sharable terminal. In such a case, the individual terminal information 111 of the specified client terminal 5 is deleted from the resource sharable terminal information 110.

Figure 12:
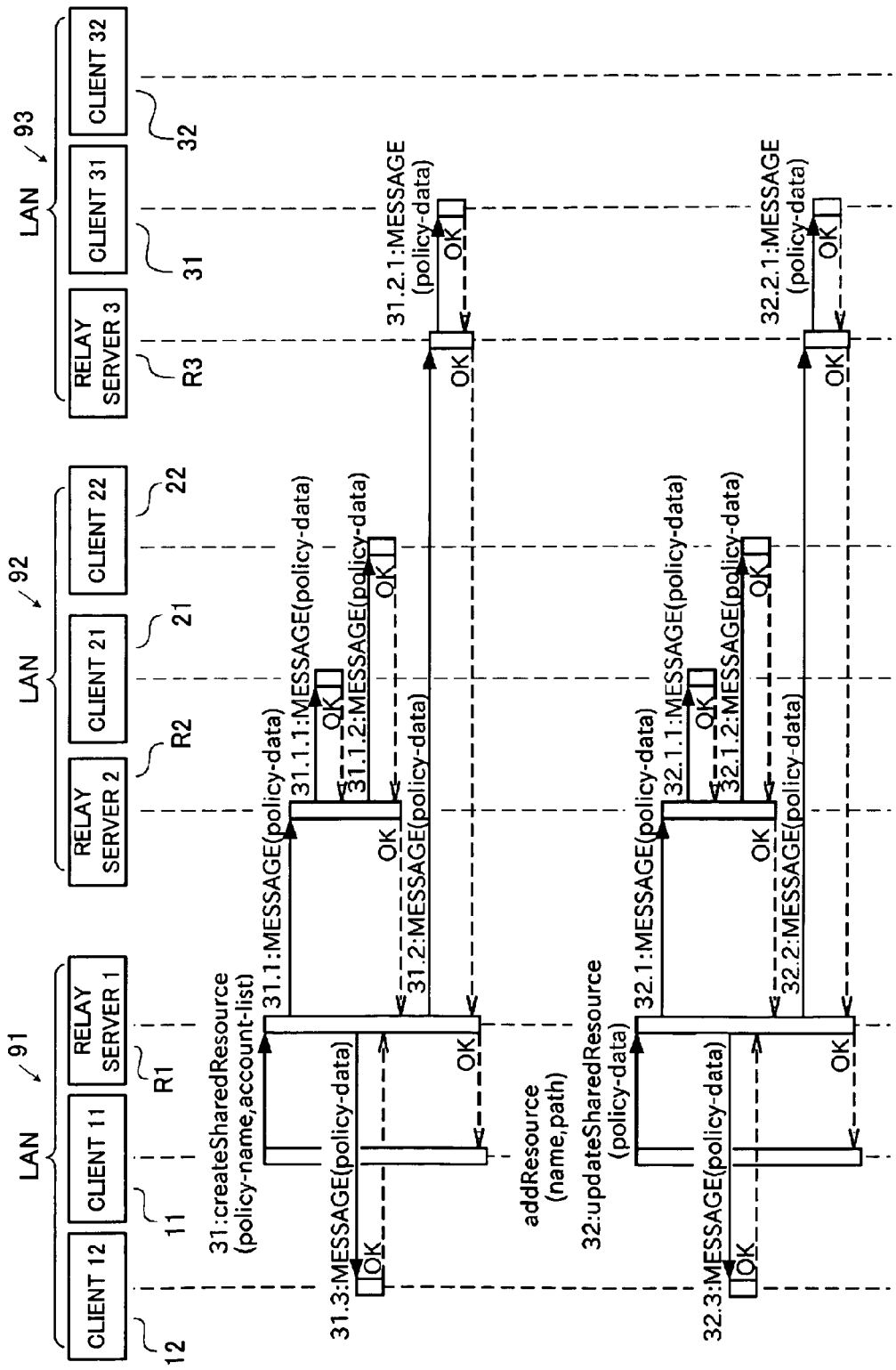
FIG. 12 is a sequence chart illustrating a communication process that registers a shared resource in the relay group according to a preferred embodiment of the present invention.

Next, with reference to FIG. 12, an operation of sharing the resource of the client terminal 5 will be described. Here, an example of sharing a folder "folderA" held by the client terminal 11 with the client terminals 12, 21, 22, and 31 in the relay group having the identification ID "0001@relay-server1" will be described.

The user specifies the relay group having the identification ID "0001@relay-server1" by operating the client terminal 11, and then gives an instruction to the client terminal 11 to display the resource sharable terminals of the relay group. The client terminal 11 acquires the information related to the resource sharable terminals by communicating with the relay server R1, and displays, on a screen, a list of resource sharable terminals of the specified relay group.

Since the relay group having the identification ID "0001@relay-server1" is specified, the client terminals 12, 21, 22, and 31 are displayed as the resource sharable terminals based on the resource sharable terminal information 110a illustrated on the upper side of FIG. 6. The user specifies all the displayed client terminals 12, 21, 22, 31 as the terminals (user client terminals) that will share the resource. Although all of the terminals are specified to share the resource in the present example, some of the terminals may be specified instead.

Figure 13:
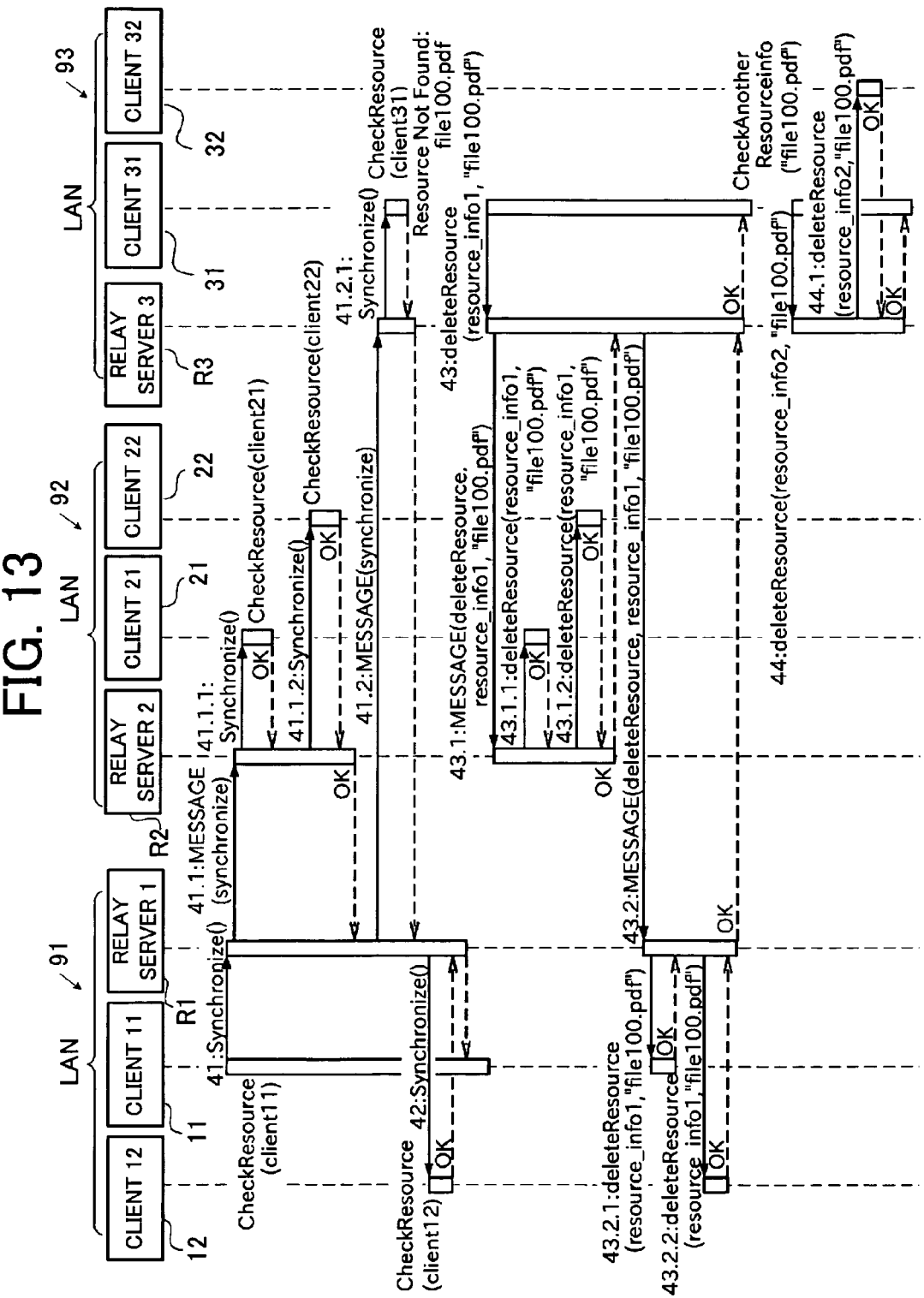
FIG. 13 is a sequence chart illustrating a shared-resource-information synchronizing process in a relay communication system according to a preferred embodiment of the present invention.

Accordingly, the client terminal 11 transmits a request (createSharedResource command) for creating a shared resource to the relay server R1 (sequence number 31 of FIG. 13). The message includes the identification ID of the relay group and the information related to the specified user client terminals 12, 21, 22, and 31.

Having received the message, the relay server R1 creates the shared resource information 120 to store in the shared resource information database 506 thereof. Further, by referring to the content of the relay group information database 505 based on the identification ID of the relay group, the relay server R1 transmits a "policy-data message" to the relay servers R2 and R3, which form the relay group, and notifies the created shared resource information 120 (sequence numbers 31.1 and 31.2). Furthermore, the relay server R1 transmits the "policy-data message" to the client terminal 12, which is the specified user client terminal and belongs to the relay server R1, and notifies the shared resource information 120 (sequence number 31.3).

Having received the message, each relay server R2 and R3 stores the shared resource information 120 in the respective shared resource information database 506. Moreover, each relay server R2 and R3 transmits the "policy-data message" to each of the specified user client terminals 21, 22, and 31, and notifies the shared resource information 120 (sequence numbers 31.1.1, 31.1.2, 31.2.1).

Having received the "policy-data message", each user client terminal 12, 21, 22, and 31 changes the shared resource information 120 stored in the respective shared resource information databases 604, and then returns to an "OK" response to the relay servers R1, R2, and R3, which are the transmission source. Having received the "OK" response, the relay servers R2 and R3 return an "OK" response to the relay server R1. Having received the response, the relay server R1 returns an "OK" response to the client terminal 11.

Thus, the shared resource identification information 123 and the family account information 124 have been described in the shared resource information 120 stored in the shared resource information database 506 of each relay server R1, R2, and R3. The same content is described in the shared resource information 120 stored in the shared resource information database 604 of each client terminal 11, 12, 21, 22, and 31.

Then, the user operates the client terminal 11 to execute an "addResource method". Accordingly, a process of adding the resource information (reference numeral 126 of FIG. 8) indicating the shared resource to the shared resource information 120 is performed. In the present example, the "folderA" is selected from the resources stored in the resource storage unit 603 of the client terminal 11, and specified to be shared by the other client terminals 12, 21, 22, and 31.

Having received such specification, the client terminal 11 transmits, to the relay server R1, a shared resource change request (updateSharedResource command) including the specified information (sequence number 32). Having received the shared resource change request, the relay server R1 stores the changed shared resource information in the shared resource information database 506 thereof. Then, the relay server R1 transmits the "policy-data message" to each relay server R2 and R3 to which the user client terminals 21, 22, and 31 are connected, and notifies the changed shared resource information 120 (sequence numbers 32.1 and 32.2). Moreover, the relay server R1 transmits the "policy-data message" to the client terminal 12, which is the specified user client terminal and belongs to the relay server R1, and notifies the shared resource information 120 (sequence number 32.3)

Having received the message, each relay server R2 and R3 stores the shared resource information 120 in the shared resource information database 506 thereof. Moreover, each relay server R2 and R3 transmits the "policy-data message" to each of the specified user client terminals 21, 22, and 31, and notifies the shared resource information 120 (sequence numbers 32.1.1, 32.1.2, and 32.2.1).

Having received the "policy-data message", each user client terminal 12, 21, 22, and 31 changes the shared resource information 120 stored in the respective shared resource information databases 604, and returns an "OK" response to the relay servers R1, R2, and R3, which are the transmission sources. Having received the "OK" response, the relay servers R2 and R3 return an "OK" response to the relay server R1. Having received the response, the relay server R1 returns an "OK" response to the client terminal 11.

Next, with reference to sequence numbers 41 through 44 of FIG. 13, a process of synchronizing the registered shared resource information and the resource will be described.

In the client terminal 11, the shared resource information is specified by using the ID (20071001150032client11@relay-server1) or the name (workspace1), and a command (CheckResource command) is executed to check the resource. The command may be regularly executed, or may be executed by the user when necessary. When the command is executed, the client terminal 11 searches the shared resource information 120 stored in the shared resource information database 604 thereof. Then, it is determined from the family resource information 125 that the owner client terminal of the shared resource is the client terminal 11, and accordingly, the client terminal 11 checks the resource. More specifically, the client terminal 11 checks whether or not the resource actually exists and whether or not the file size and time stamp information differ from the content described in the resource information 126, or the like.

Next, the client terminal 11 transmits a synchronization instruction to the relay server R1 (sequence number 41). The synchronization instruction includes information that indicates which shared resource information is to be synchronized. Having received the synchronization instruction, the relay server R1 checks the family account information 124 of the shared resource information 120 stored in the shared resource information database 506 thereof. Accordingly, it is determined that the client terminals 12, 21, 22, and 31 are the user client terminals. Then, by referring to the relay group information 100, it is determined that the client terminals 21, 22, and 31 belong to the same relay group as the client terminal 11, and belong to the relay server R2 or R3

The relay server R1 then transmits a synchronization message to the relay servers R2 and R3 (sequence numbers 41.1 and 41.2). The synchronization message includes information that indicates which shared resource information is to be synchronized. Moreover, the relay server R1 transmits the synchronization instruction to the client terminal (i.e., the client terminal 12) other than the client terminal 11, which is the sharing member terminal of the relay server R1 and gave the synchronization instruction (sequence number 42).

Having received the synchronization message from the relay server R1, the relay servers R2 and R3 check the family account information 124 of the shared resource information 120 stored in the respective resource information databases 506. Then, the relay servers R2 and R3 find the client terminals (in the present example, the terminals 21, 22, and 31), which belong to the relay server R2 or R3 and are the user client terminals. Accordingly, the relay servers R2 and R3 transmit the synchronization instruction to the client terminals. These processes correspond to the sequence numbers 41.1.1, 41.1.2, and 41.2.1. The synchronization instruction includes information that indicates which shared resource information is to be synchronized.

Having received the synchronization instruction, each client terminal 12, 21, 22, and 31 executes a resource check command (CheckResource). A detailed operation of the command is omitted since it is similar to the description of the client terminal 11. If no inconsistency is found between the resource and the shared resource information, each client terminal returns an "OK" response to the respective relay servers 1, which transmitted the synchronization instruction to each client terminal.

Next, with reference to FIG. 13 again, a process performed when inconsistency is found between the resource and the shared resource information will be described.

In the present example, when the client terminal 31 checks the resource in response to the synchronization instruction of sequence number 41.2.1 of FIG. 13, the terminal 31 detects that the file has been deleted (Resource Not Found: file100.pdf).

When the client terminal 31 detects that the "file100.pdf" thereof has been deleted, the client terminal 31 deletes the resource information 126 related to the "file100.pdf" from the shared resource information 120 stored in the shared resource information database 604 thereof. Further, the client terminal 31 transmits a resource information deletion instruction (deleteResource command) to the relay server R3 (sequence number 43). The resource information deletion instruction includes "resource_info1" that indicates the target shared resource information and the file name "file100.pdf" to be deleted.

Having received the resource information deletion instruction, the relay server R3 refers to the shared resource information that is stored in the shared resource information database 506 thereof and indicated in the "resource_info1". Accordingly, it is determined that the user client terminals of the "file100.pdf" are the terminals 11, 12, 21, and 22. Further, the relay server R3 refers to the relay group information stored in the relay group information database 505 thereof. Thus, it is determined that each client terminal belongs to the relay server R1 or R2.

The relay server R3 then transmits a shared resource information deletion message to the relay servers R1 and R2 (sequence numbers 43.1 and 43.2). Having received the message, each relay server R1 and R2 transmits the resource information deletion instruction to the client terminals that belong to the relay server R1 or R2 and share the deleted file (sequence numbers 43.1.1, 43.1.2, 43.2.1, and 43.2.2). The resource information deletion message and the deletion instruction include the "resource_info1" that indicates the target shared resource information and the filename "file100.pdf" to be deleted.

Having received the resource information deletion instruction, each user client terminal deletes the resource information 126 related to the file from the family resource information 125 included in the shared resource information 120 indicated in the "resource_info1", and stores the updated shared resource information 120 in the respective shared resource information databases 604. Then, each user client terminal returns an "OK" response to the relay server that is the transmission source of the resource information deletion instruction.

Having received the "OK" response, the relay servers R1 and R2 delete the resource information 126 similarly to the user client terminals, and return an "OK" response to the relay server R3. Thus, the update added to the shared resource information 120 by the client terminal 31 has been reflected in the shared resource information 120 stored in the relay servers and the other sharing member terminals.

When the client terminal 31 detects that the "file100.pdf" has been deleted, the client terminal 31 executes a "CheckAnotherResourceinfo command", and checks whether or not there is another shared resource information that includes the "file 100.pdf" as the resource information.

As described above, in the present preferred embodiment, the relay group formed by the client terminals 11, 12, 21, 22, and 31 and the relay group formed by the client terminals 31 and 32 are registered (relay group information 100a and 100b of FIG. 6). In the example of FIG. 13, the "file100.pdf", which is shared by the former relay group and is detected to be non-existent by the synchronization instruction, is also shared by the client terminals 31 and 32 in the latter relay group. The illustration of a specific content of the shared resource information of the relay group formed by the client terminals 31 and 32 is omitted.

When the client terminal 31 detects the non-existence of the "file100.pdf", the client terminal 31 checks, by using the "CheckAnotherResourceinfo command", whether or not other shared resource information includes the file. As a result, it is determined that the shared resource information of the relay group formed by the client terminals 31 and 32 includes the non-existent "file100.pdf".

Accordingly, the client terminal 31 specifies the found shared resource information by using "resource_info2", and transmits an instruction to delete the "file100.pdf" to the relay server R3 (sequence number 44). Since the terminals that are related to the shared resource information specified in the "resource_info2" are the client terminals 31 and 32, the relay server R3 transmits the resource information deletion instruction to the client terminal 32. Since the subsequent processes are similar to the above, the description thereof is omitted. Thus, the synchronization instruction can be transmitted to the other terminals of the relay group that is different from the relay group of the client terminal 11, which initially gave the synchronization instruction.

With the above-described unique configuration, when a mismatch between the resource and the resource information is detected by the synchronization instruction given with respect to one piece of shared resource information, the update instruction with respect to the information automatically reaches the entire system, and the entire system can be maintained in the latest state.

As described above, the relay server 1 of the present preferred embodiment preferably includes the relay group information database 505, the shared resource information database 506, and the control unit 503. The relay group information database 505 stores the relay group information 100 related to the relay group that includes other relay servers 1 that can be connected to the relay server. When sharing a resource by a plurality of client terminals 5 in the relay group, the shared resource information 120 is stored in the shared resource information database 506. The shared resource information 120 includes the family resource information 125, which is the information that is related to the resource to be shared by the client terminals 5, and the family account information 124, which is the account information of the resource sharing terminals, i.e., the client terminals 5 that share the resource. As described in the sequence numbers following the sequence number 41 of FIG. 13, for example, the control unit 503 of the relay server R1 distributes, after receiving the synchronization instruction (Synchronize command) with respect to the shared resource information 120 from the client terminal 11, the synchronize message to each relay server R2 and R3, and distributes the "Synchronize command" to the resource sharing terminal 12, which belongs to the relay server R1. Moreover, when the relay server R3 receives the synchronization instruction (synchronize message) from the relay server R1, based on the relay group information 100 and the shared resource information 120, the relay server R3 distributes the "Synchronize command" to the resource sharing terminal 31, which belongs to the relay server R3. Then, the relay server R3 instructs the resource sharing terminal 31, which has received the "Synchronize command", to check the shared resource with respect to the shared resource that can be handled by the resource sharing terminal 31, and to update the shared resource information, if necessary.

Accordingly, by giving one synchronization instruction from the client terminal 11 to the relay server R1 of the relay group, all of the resource information that is shared by the resource sharing terminals 5 other than the client terminal 11 or by the other relay servers R2 and R3 can be checked, and the shared resource information 120 can be updated. Accordingly, the resource and the content of the shared resource information 120 can be easily matched.

As described in the sequence numbers 41, 41.1, and 41.2, in response to the reception of the "Synchronize command" from the client terminal 11, the control unit 503 of the relay server R1 distributes the synchronization instruction (synchronize message) to each relay server R2 and R3.

Thus, by operating the client terminal 11 by the user, the shared resource information can be synchronized with the resource.

When the shared resource information 120 is updated by the resource sharing terminal 31, which belongs to the relay server R3, the relay server R3 reflects the update in the shared resource information 120 of each relay server R1 and R2, based on the relay group information 100 and the shared resource information 120.

Thus, the relay servers land the resource sharing terminals 5 thereof that belong to the same relay group can automatically acquire the latest shared resource information 120. Accordingly, the synchronization of the shared resource information of the entire network can be easily performed.

When the synchronization instruction (Synchronize command) is received from the relay server R3, the resource sharing terminal 31 checks whether or not there is the shared resource that can be handled by the resource sharing terminal 31, deletes the corresponding resource information 126 from the shared resource information 120 and updates the shared resource information 120 when the resource does not exist.

Accordingly, when the resource has been deleted, the corresponding resource information 126 can be automatically deleted from the shared resource information 120. Therefore, the sharing of the non-existent resource can be prevented.

A plurality of shared resource information 120 can be registered in the shared resource information database 506 of the relay server 1. When the plurality of shared resource information 120 includes the resource information 126 of the non-existent "file100.pdf", the relay server R3 deletes the resource information 126 from the respective shared resource information 120, and updates each of the shared resource information 120 as described in sequence numbers 43 and 44.

Therefore, the plurality of shared resource information 120 can be updated by one synchronization instruction.

Figure 14:
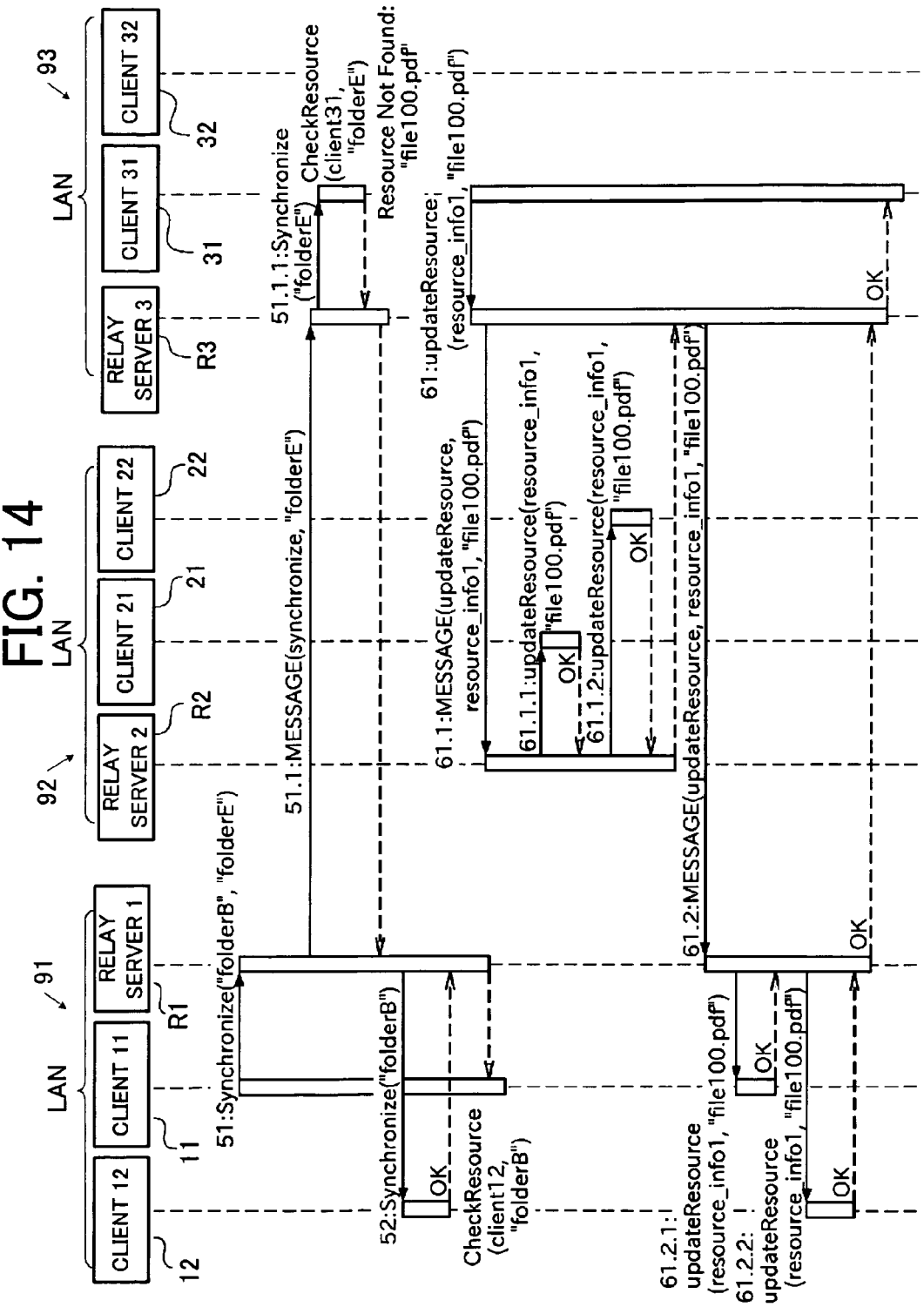
FIG. 14 is a sequence chart illustrating a shared-resource-information synchronizing process in a relay communication system according to another preferred embodiment of the present invention.

FIG. 14 is a sequence chart illustrating an operation performed when the resource information is separately specified to update the shared resource information. It is assumed in FIG. 14 that the individual shared resource information 122 of the shared resource information of FIG. 7 is shared by the client terminals 11, 12, 21, 22, and 31.

When a synchronization instruction with respect to a "folderB" and a "folderE" is transmitted from the client terminal 11 to the relay server R1 (sequence number 51), the relay server R1 transmits the synchronization message regarding the "folderE" to the relay server R3 (sequence number 51.1). The relay server R1 also transmits the synchronization instruction with respect to the "folderB" to client terminal 12 (sequence number 52). The relay server R3 transmits the synchronization instruction with respect to the "folderE" to the client terminal 31 (sequence number 51.1.1).

Differing from the example of FIG. 13, the synchronization message and the synchronization instruction are not transmitted to the relay server R2 and to the client terminals 21 and 22 in the example of FIG. 14. That is because, when specifying the resource information and transmitting the synchronization instruction, the relay server R1 can refer to the shared resource information stored in the shared resource information database 506 thereof, and transmit the synchronization instruction only to the terminals that can handle the resource related to the resource information. Consequently, network traffic can be reduced, and performance can be increased. Further, if the user desires to know whether or not a certain resource has been updated, the relevant resource can be specially specified, and the corresponding resource information can be acquired.

FIG. 14 also illustrates another example of a process performed when the resource does not exist (Resource Not Found:"file100.pdf").

In the above-mentioned example, when the resource does not exist, instead of transmitting the resource information deletion instruction as FIG. 13, a resource information update instruction is transmitted (sequence number 61), and the resource information is updated. More specifically, an instruction to write in status information (refer to FIG. 9) such as status="file not found" in a prescribed portion of the resource information is transmitted. Since the processes after the sequence number 61 are similar to the case of the resource information deletion instruction, the description thereof is omitted.

By the above-described process, compared with the case of simply deleting the resource information from the shared resource information, the deletion of the resource can be more clearly indicated. Furthermore, when the resource cannot be temporarily accessed, and then the access is enabled again, a return operation can be easily performed.

When a file is updated by being overwritten, and corresponding time stamp and file size are changed, synchronization can be performed by rewriting a portion of the time stamp and the file size instead of rewriting the status information in the resource information 126 related to the file of the shared resource information 120.

As described above, the relay server R1 can distribute a synchronization instruction with respect to a certain resource (such as "folderB") of the shared resource information 120 (sequence numbers 51.1 and 52, etc.)

Thus, the synchronization with respect to the certain resource can be performed. Moreover, since the resource to be synchronized is recognized in advance, the processes can be performed efficiently.

Operations of the relay server 1 and the client terminal 5 will now be described in detail with reference to FIGS. 15 and 16.

Figure 15:
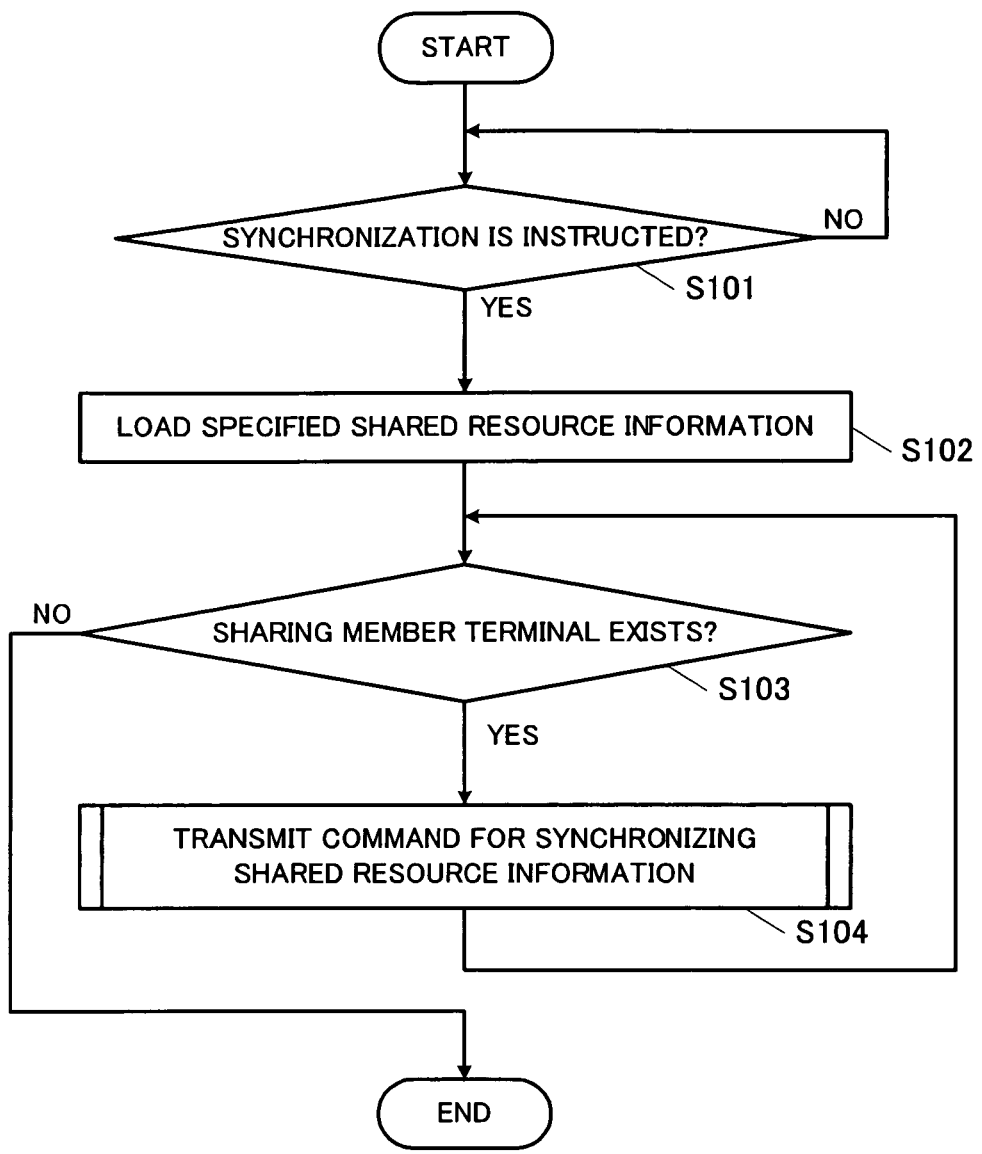
FIG. 15 is a flowchart of a process in which a server that has received the synchronization instruction transmits a synchronization command to a sharing member terminal according to a preferred embodiment of the present invention.

FIG. 15 is a flowchart of an operation of transmitting a synchronization instruction to the sharing member terminals described in the shared resource information when the relay server 1 of the present preferred embodiment receives the synchronization instruction with respect to the shared resource information from the client terminal 5 or from another relay server 1. The relay server 1 first waits until the synchronization instruction is given (S101), and loads the specified shared resource information when the synchronization instruction is given (S102).

Next, the relay server 1 checks whether or not the sharing member terminals exist in the shared resource information (S103), and if the sharing member terminals exist, the relay server 1 transmits a synchronization signal related to the shared resource information (S104). In this case, if the sharing member terminals to which the synchronization signal is to be transmitted belong to the relay server 1, the relay server 1 directly transmits the synchronization signal to the client terminals 5. If the sharing member terminals do not belong to the relay server 1, the relay server 1 transmits the synchronization instruction (synchronization message) to the other relay server(s) 1 to which the sharing member terminals belong. Having received the synchronization message, the other relay server(s) 1 exits from the determination loop of S101, proceeds to the process of S102, and transmits the synchronization instruction to the sharing member terminals which belong to the other relay server(s). Thus, the synchronization instruction can be indirectly transmitted to the sharing member terminals that belong to other LAN(s).

Next, returning to S103, it is checked whether or not there are other sharing member terminals. When the other sharing member terminals do not exist, or when the synchronization command has been transmitted to all of the sharing member terminals, the process is ended.

Figure 16:
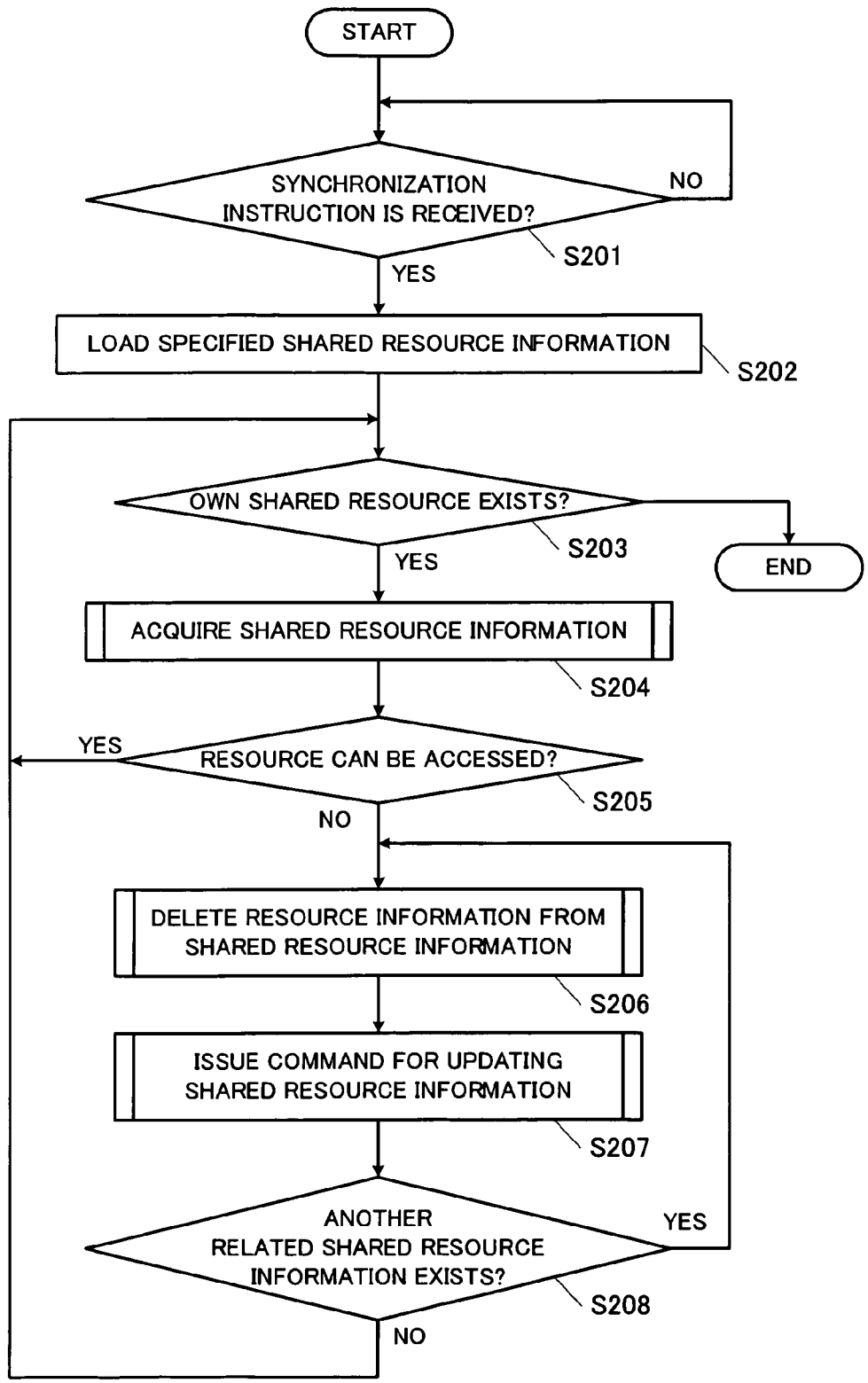
FIG. 16 is a flowchart of a process in which the sharing member terminal that has received the synchronization instruction updates the shared resource information according to a preferred embodiment of the present invention.

FIG. 16 is a flowchart of an operation performed when the client terminal 5 of the present preferred embodiment receives the synchronization instruction from the relay server 1.

The client terminal 5 waits until the synchronization instruction is given (S201), and loads the specified shared resource information when the synchronization instruction is given (S202). Then, the client terminal 5 checks whether or not the shared resource thereof exists in the shared resource information (S203). In the present preferred embodiment, since the resource is checked by the terminal that can handle the resource, the process is ended when the shared resource does not belong to the terminal (i.e., the terminal that owns the shared resource).

When the shared resource whose owner is the terminal 5 exists, the client terminal 5 acquires the corresponding shared resource information (S204), and checks whether or not the resource can be accessed (S205). If the resource can be accessed, the terminal 5 returns to the checking of other shared resources. If the resource cannot be accessed, the client terminal 5 performs a process of deleting the corresponding resource information from the shared resource information (S206), and transmits a shared resource information update command to the relay server 1 (S207). Then, the client terminal 5 checks whether or not there is other shared resource information that includes the deleted shared resource (S208).

When there is the other shared resource information, the process returns to S206, and the process of deleting the resource information from the other shared resource information is performed. When there is no corresponding shared resource information, the process returns to S203, and the checking of the other shared resource included in the shared resource information initially instructed in S202 is continued.

Preferred embodiments of the present invention have been described, however, the above-described configuration may be modified in many various ways include the examples described below.

In the above-described preferred embodiments, the communication between each relay server 1 is preferably performed through the external server 2, which is a SIP server, however, in place of such a configuration, the communication may be directly performed between the relay servers 1 without through the external server 2.

In the above-described preferred embodiments, the time stamp and file size of the resource are preferably described in the shared resource information as specific information of the resource, however, in place of such information, or in addition to such information, a hash value and the like of the resource may be described. Such a case is more preferable in that the modification, alteration, damage, or the like of the resource can be checked more reliably.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server which is connected to a LAN and which communicates via a WAN with a plurality of different relay servers respectively connected to a plurality of different LANs, the relay server comprising:
    a relay group information registration unit including hardware and software and being configured to store information of a relay group including account information of:
        the relay server;
        the plurality of different relay servers;
        a client terminal connected to the relay server via the LAN; and
        a plurality of different client terminals respectively connected to the plurality of different relay servers via the plurality of different LANs;
    a shared resource information registration unit configured to store, when a resource capable of being handled by only one of the client terminal and the plurality of different client terminals is shared by the client terminal and the plurality of different client terminals in the relay group, shared resource information including:
        account information of a client terminal capable of handling the resource;
        information regarding a name of the resource; and
        account information of a client terminal sharing the resource; and a control unit configured or programmed to, in response to an instruction to synchronize the shared resource information being received from the client terminal sharing the resource:
  determine the client terminal capable of handling the resource based on the shared resource information;
  identify a relay server connected to the determined client terminal based on the relay group information;
  distribute the synchronization instruction only to the determined client terminal via the identified relay server and not to any other client terminals within the entire relay communication system including the plurality of different client terminals;
  instruct the determined client terminal to synchronize the shared resource information with the resource via the identified relay server; and
  update the shared resource information in the shared resource information registration unit in response to a resource information update instruction being received from the determined client terminal via the identified relay server.

2. The relay server according to claim 1, wherein the control unit distributes the synchronization instruction to each of the relay server and the different relay server or to the resource sharing terminal connected to the relay server.

3. The relay server according to claim 2, wherein, when the shared resource information is updated by the resource sharing terminal connected to the relay server, the update is reflected in the shared resource information of the different relay server and in the shared resource information of the resource sharing terminal connected to the relay server.

4. The relay server according to claim 3, wherein:
the determined client terminal that has received the synchronization instruction checks whether or not the resource that can be handled by the determined client terminal exists; and
when the resource does not exist, the determined client terminal:
  deletes corresponding resource information from the shared resource information; and
  updates the shared resource information.

5. The relay server according to claim 4, wherein:
a plurality of shared resource information data can be registered in the shared resource information registration unit; and
when the plurality of shared resource information data includes information related to the resource that does not exist, the relay server provides an instruction to:
  delete corresponding resource information data from each of the plurality of shared resource information data; and
  update the shared resource information.

6. The relay server according to claim 2, wherein:
the determined client terminal that has received the synchronization instruction checks whether or not the resource that can be handled by the determined client terminal exists; and
when the resource does not exist, the determined client terminal:
  deletes corresponding resource information from the shared resource information; and
  updates the shared resource information.

7. The relay server according to claim 6, wherein:
a plurality of shared resource information data can be registered in the shared resource information registration unit; and
when the plurality of shared resource information data includes information related to the resource that does not exist, the relay server provides an instruction to:
  delete corresponding resource information data from each of the plurality of shared resource information data; and
  update the shared resource information.

8. The relay server according to claim 2, wherein another synchronization instruction with respect to another resource in the shared resource information is distributed.

9. The relay server according to claim 1, wherein, when the shared resource information is updated by the resource sharing terminal connected to the relay server, the update is reflected in the shared resource information of the different relay server and in the shared resource information of the resource sharing terminal connected to the relay server.

10. The relay server according to claim 9, wherein:
the determined client terminal that has received the synchronization instruction checks whether or not the resource that can be handled by the determined client terminal exists; and
when the resource does not exist, the determined client terminal:
  deletes corresponding resource information from the shared resource information; and
  updates the shared resource information.

11. The relay server according to claim 10, wherein:
a plurality of shared resource information data can be registered in the shared resource information registration unit; and
when the plurality of shared resource information data includes information related to the resource that does not exist, the relay server provides an instruction to:
  delete the corresponding resource information data from each of the plurality of shared resource information data; and
  update the shared resource information.

12. The relay server according to claim 9, wherein another synchronization instruction with respect to another resource in the shared resource information is distributed.

13. The relay server according to claim 1, wherein:
the determined client terminal that has received the synchronization instruction checks whether or not the resource that can be handled by the determined client terminal exists; and
when the resource does not exist, the determined client terminal:
  deletes corresponding resource information from the shared resource information; and
  updates the shared resource information.

14. The relay server according to claim 13, wherein:
a plurality of shared resource information data can be registered in the shared resource information registration unit; and
when the plurality of shared resource information data includes information related to the resource that does not exist, the relay server provides an instruction to:
  delete corresponding resource information data from each of the plurality of shared resource information data; and
  update the shared resource information.

15. The relay server according to claim 13, wherein another synchronization instruction with respect to another resource in the shared resource information is distributed.

16. The relay server according to claim 13, wherein the resource is one of a file and a folder.

17. The relay server according to claim 1, wherein another synchronization instruction with respect to another resource in the shared resource information is distributed.

18. A relay communication system comprising:
a plurality of relay servers, each of the plurality of relay servers is connected to a corresponding LAN and is configured to communicate with the other of the plurality of relay servers via a WAN; and
a plurality of client terminals, each of the plurality of client terminals is connected to a corresponding one of the plurality of relay servers via one of the corresponding LANs; wherein
each of the plurality of relay servers includes:
a relay group information registration unit configured to store information of a relay group including account information of:
each of the plurality of relay servers; and
each of the plurality of client terminals including to which one of plurality of the relay servers each of the plurality of client terminals is connected;
a shared resource information registration unit configured to store, when a resource capable of being handled by only one of the plurality of client terminals is shared by the plurality of client terminals in the relay group, shared resource information including:
account information of a client terminal capable of handling the resource;
information regarding a name of the resource; and
account information of a client terminal sharing the resource; and
a control unit configured or programmed to, in response to an instruction to synchronize the shared resource information being received from the client terminal sharing the resource:
determine the client terminal capable of handling the resource based on the shared resource information;
identify a relay server connected to the determined client terminal based on the relay group information;
distribute the synchronization instruction only to the determined client terminal via the identified relay server and not to any other client terminals within the entire relay communication system including the plurality of different client terminals;
instruct the determined client terminal to synchronize the shared resource information with the resource via the identified relay server; and
update the shared resource information in the shared resource information registration unit in response to a resource information update instruction being received from the determined client terminal via the identified relay server.

19. The relay communication system according to claim 18, wherein the resource is one of a file and a folder.

20. A relay server which is connected to a LAN and which communicates via a WAN with a plurality of different relay servers respectively connected to a plurality of different LANs, the relay server comprising:
a relay group information registration unit including hardware and software and being configured to store information of a relay group including account information of:
the relay server;
the plurality of different relay servers;
a client terminal connected to the relay server via the LAN; and
a plurality of different client terminals respectively connected to the plurality of different relay servers via the plurality of different LANs;
a shared resource information registration unit configured to store, when a resource capable of being handled by only one of the client terminal and the plurality of different client terminals is shared by the client terminal and the plurality of different client terminals in the relay group, shared resource information including:
account information of a client terminal capable of handling the resource;
information regarding a name of the resource; and
account information of a client terminal sharing the resource; and
a control unit configured or programmed to, in response to an instruction to synchronize the shared resource information being received from the client terminal sharing the resource:
identify the resource based on information included in the synchronization instructions;
determine the client terminal capable of handling the resource based on the shared resource information;
identify a relay server connected to the determined client terminal based on the relay group information;
distribute the synchronization instruction only to the determined client terminal only via the identified relay server and not to any other client terminals within the entire relay communication system including the plurality of different client terminals;
instruct the determined client terminal to synchronize the shared resource information with the resource via the identified relay server; and
update the shared resource information in the shared resource information registration unit in response to a resource information update instruction being received from the determined client terminal via the identified relay server.

21. A relay communication system comprising:
a plurality of relay servers, each of the plurality of relay servers is connected to a corresponding LAN and is configured to communicate with the other of the plurality of relay servers via WAN; and
a plurality of client terminals, each of the plurality of client terminals is connected to a corresponding one of the plurality of relay servers via one of the corresponding LANs; wherein
each of the plurality of relay servers includes:
a relay group information registration unit configured to store information of a relay group including account information of:
each of the plurality of relay servers; and
each of the plurality of client terminals including to which one of plurality of the relay servers each of the plurality of client terminals is connected;
a shared resource information registration unit configured to store, when a resource capable of being handled by only one of the plurality of client terminals is shared by the plurality of client terminals in the relay group, shared resource information including:
account information of a client terminal capable of handling the resource;
information regarding a name of the resource; and
account information of a client terminal sharing the resource; and a control unit configured or programmed to, in response to an instruction to synchronize the shared resource information being received from the client terminal sharing the resource:
  identify the resource based on information included in the synchronization instructions;
  determine the client terminal capable of handling the resource based on the shared resource information;
  identify a relay server connected to the determined client terminal based on the relay group information;
  distribute the synchronization instruction only to the determined client terminal only via the identified relay server and not to any other client terminals within the entire relay communication system including the plurality of different client terminals;
  instruct the determined client terminal to synchronize the shared resource information with the resource via the identified relay server; and
  update the shared resource information in the shared resource information registration unit in response to a resource information update instruction being received from the determined client terminal via the identified relay server.

* * * * *